(12) United States Patent
Miyanabe et al.

(10) Patent No.: US 8,009,532 B2
(45) Date of Patent: Aug. 30, 2011

(54) RECORDING DEVICE AND METHOD, AND COMPUTER PROGRAM, AND RECORDING MEDIUM

(75) Inventors: Shogo Miyanabe, Higashiyamato (JP); Hiroyuki Uchino, Tokorozawa (JP); Yoshio Sasaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/670,722

(22) PCT Filed: Aug. 1, 2007

(86) PCT No.: PCT/JP2007/065092
§ 371 (c)(1),
(2), (4) Date: May 6, 2010

(87) PCT Pub. No.: WO2009/016753
PCT Pub. Date: Feb. 5, 2009

(65) Prior Publication Data
US 2010/0226230 A1    Sep. 9, 2010

(51) Int. Cl.
*G11B 7/00* (2006.01)
(52) U.S. Cl. .................................................. 369/47.43
(58) Field of Classification Search ............... 369/47.51, 369/47.52, 47.53, 116, 120, 121, 122, 47.1, 369/53.1
See application file for complete search history.

(56) References Cited

U.S. PATENT DOCUMENTS 7,778,132 B2 *  8/2010  Chu et al. .................. 369/59.11
2002/0176338 A1  11/2002  Ushiyama et al.

FOREIGN PATENT DOCUMENTS

JP    2002-352430    12/2002
JP    2004-234699    8/2004

OTHER PUBLICATIONS

International Search Report—PCT/JP2007/065092—Sep. 4, 2007.

* cited by examiner

*Primary Examiner* — Nabil Z Hindi
(74) *Attorney, Agent, or Firm* — Young & Thompson

(57) ABSTRACT

A recording apparatus includes: a first strategy calculating device (SCD) for calculating a first optimum strategy allowing jitter recorded at a first speed to satisfy a desired condition by adjusting a first standard strategy; a second SCD for calculating a second standard strategy at a second speed by performing clock cycle conversion according to a difference between the first and second speeds on the first standard strategy; a second power calculating device for calculating a second optimum power used at the second speed; a third SCD for calculating a second optimum strategy allowing jitter recorded at the second speed to satisfy a desired condition, by adjusting the second standard strategy; and a fourth SCD for calculating a third optimum strategy at a third speed, based on each of a difference between the first standard and optimum strategies and a difference between the second standard and optimum strategies.

24 Claims, 24 Drawing Sheets

[FIG. 1]
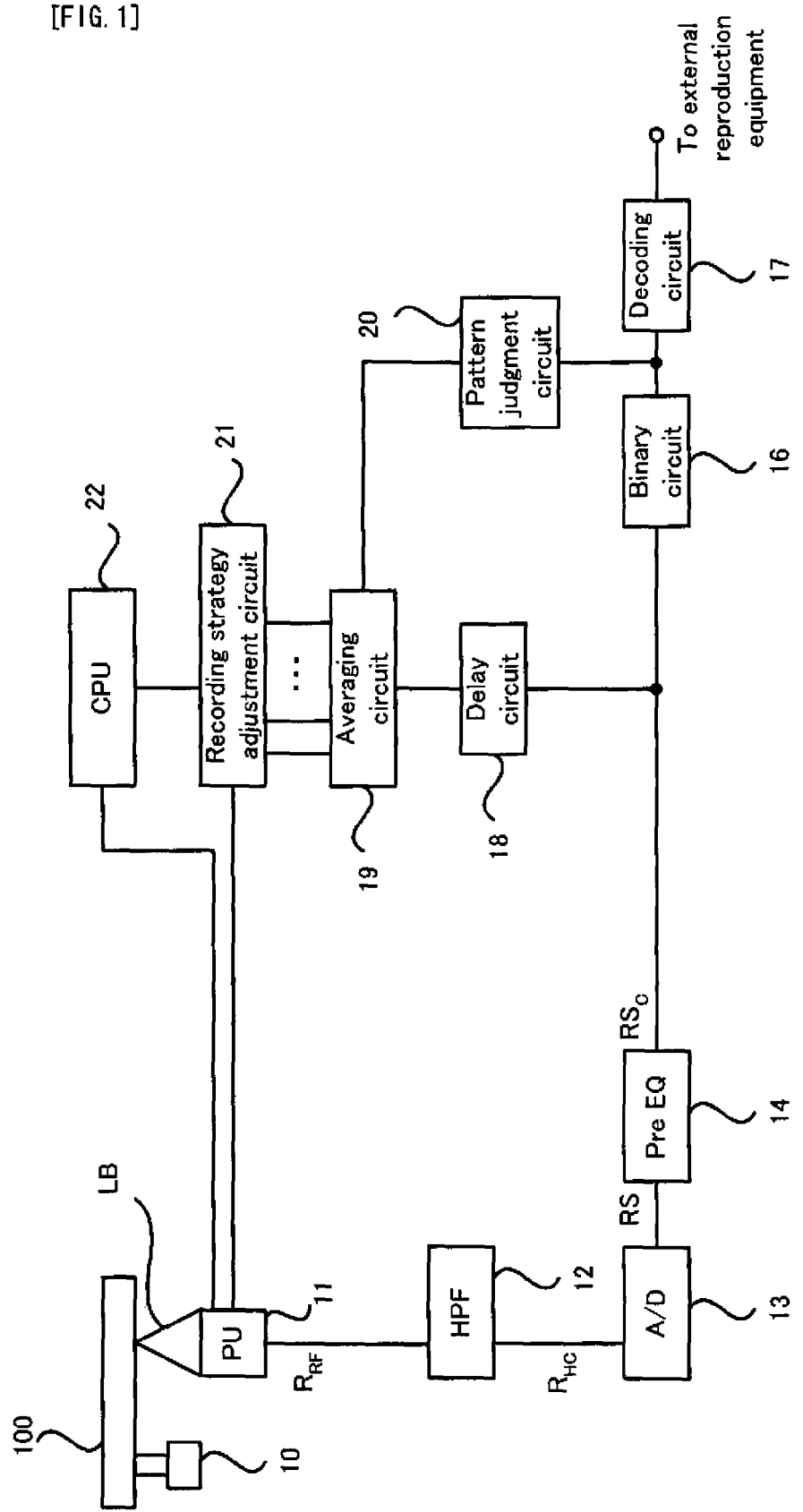

[FIG. 2]
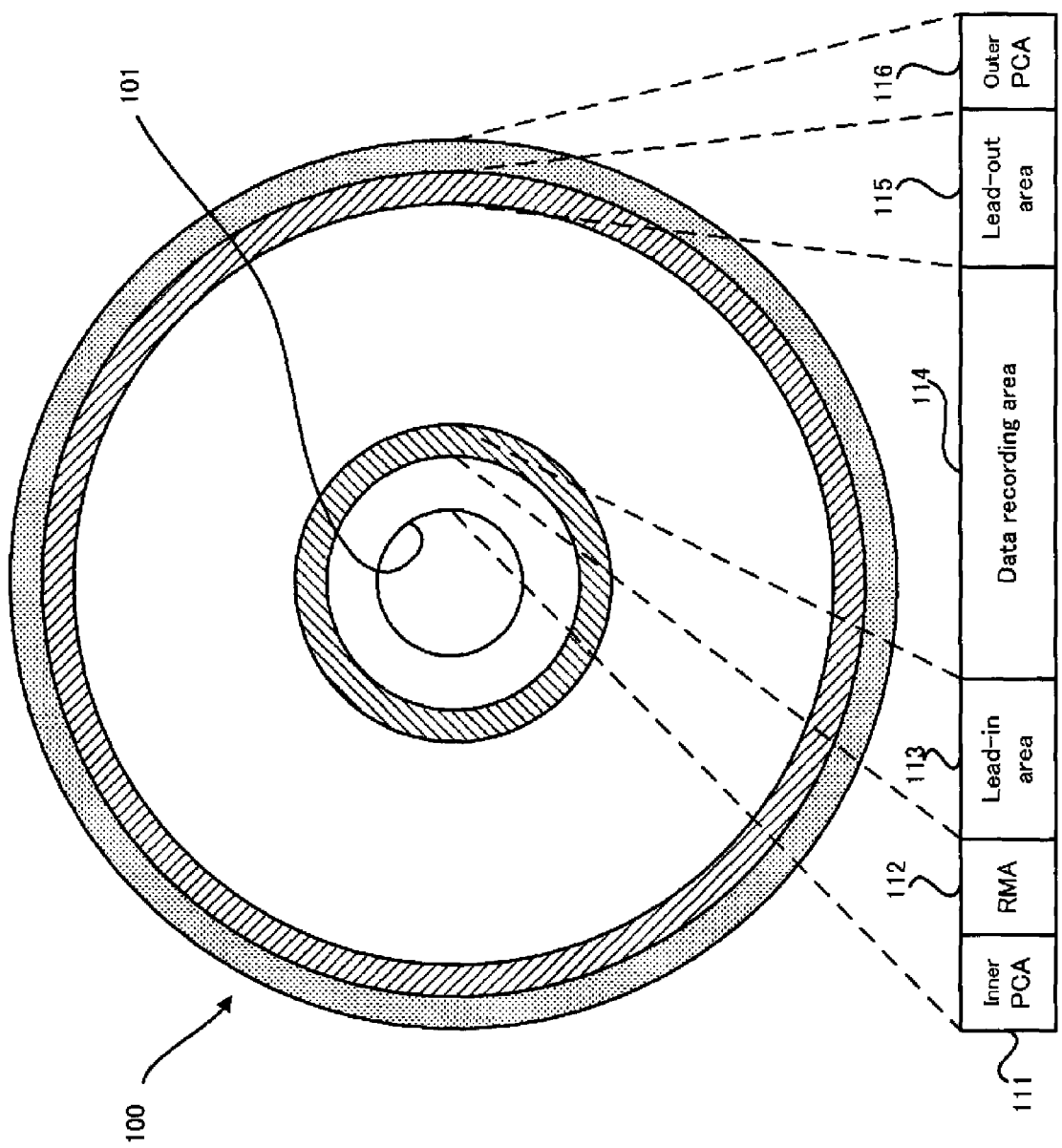

[FIG. 3]
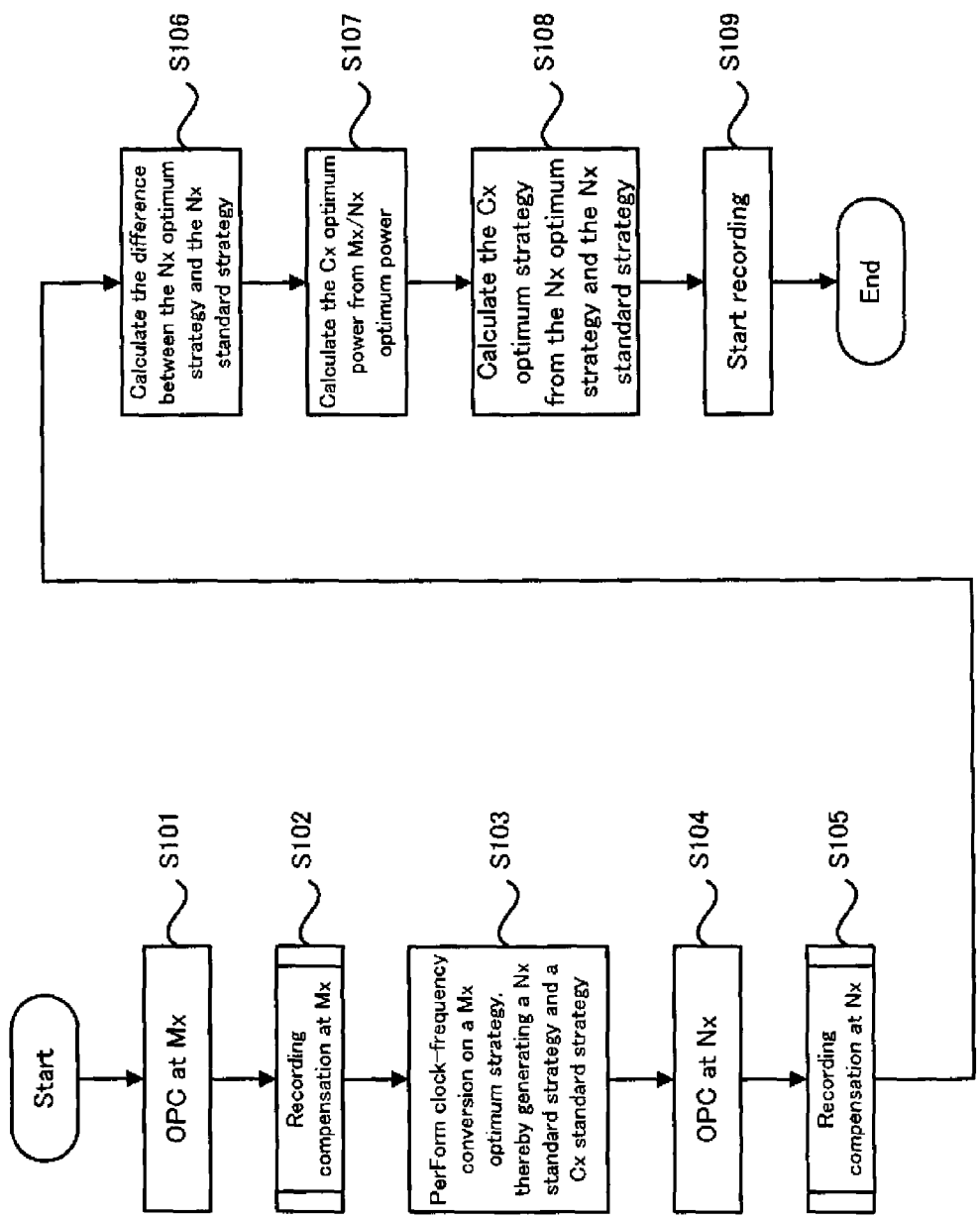

[FIG. 4]
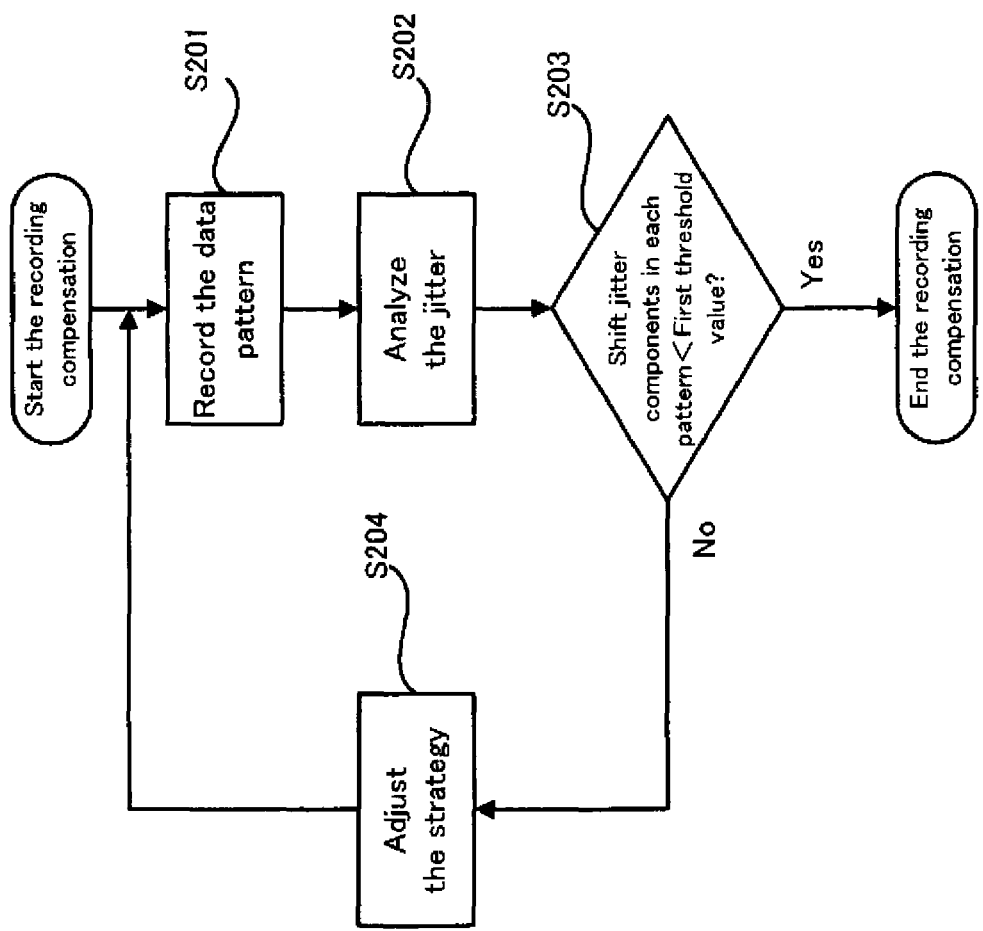

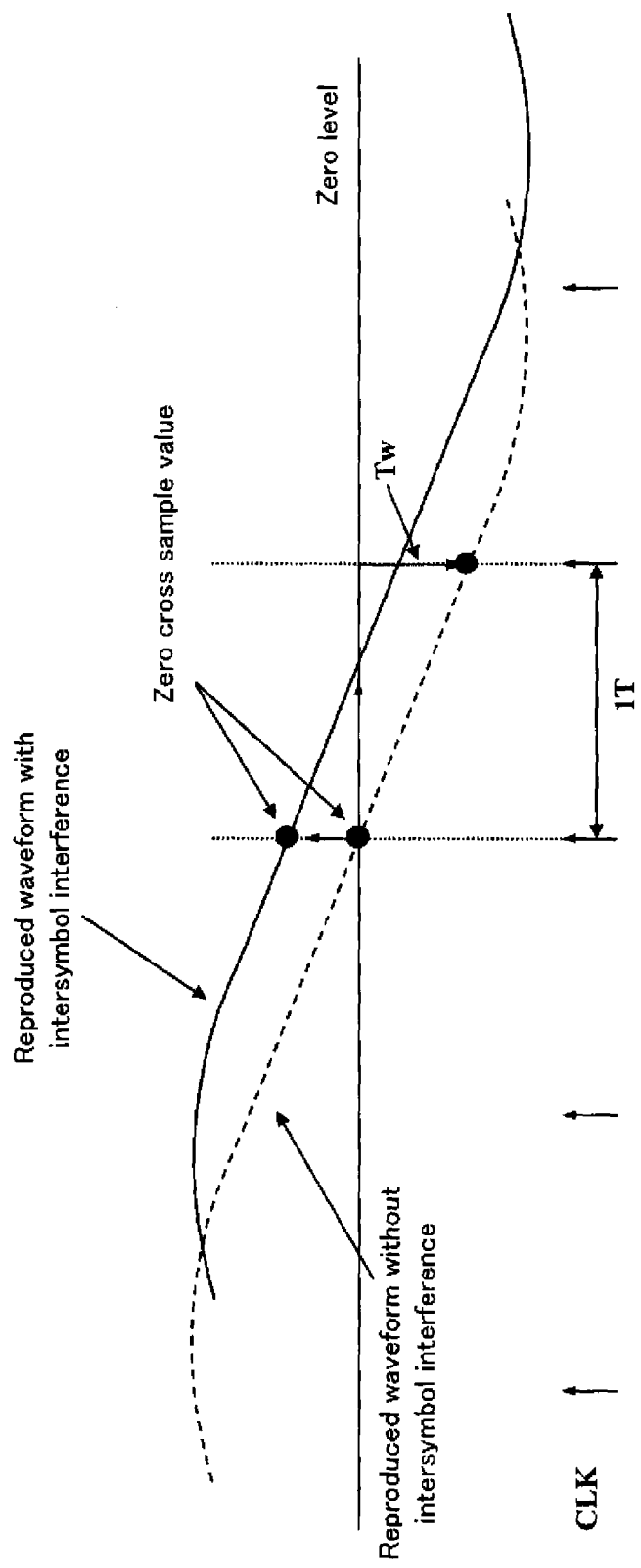
[FIG. 5]

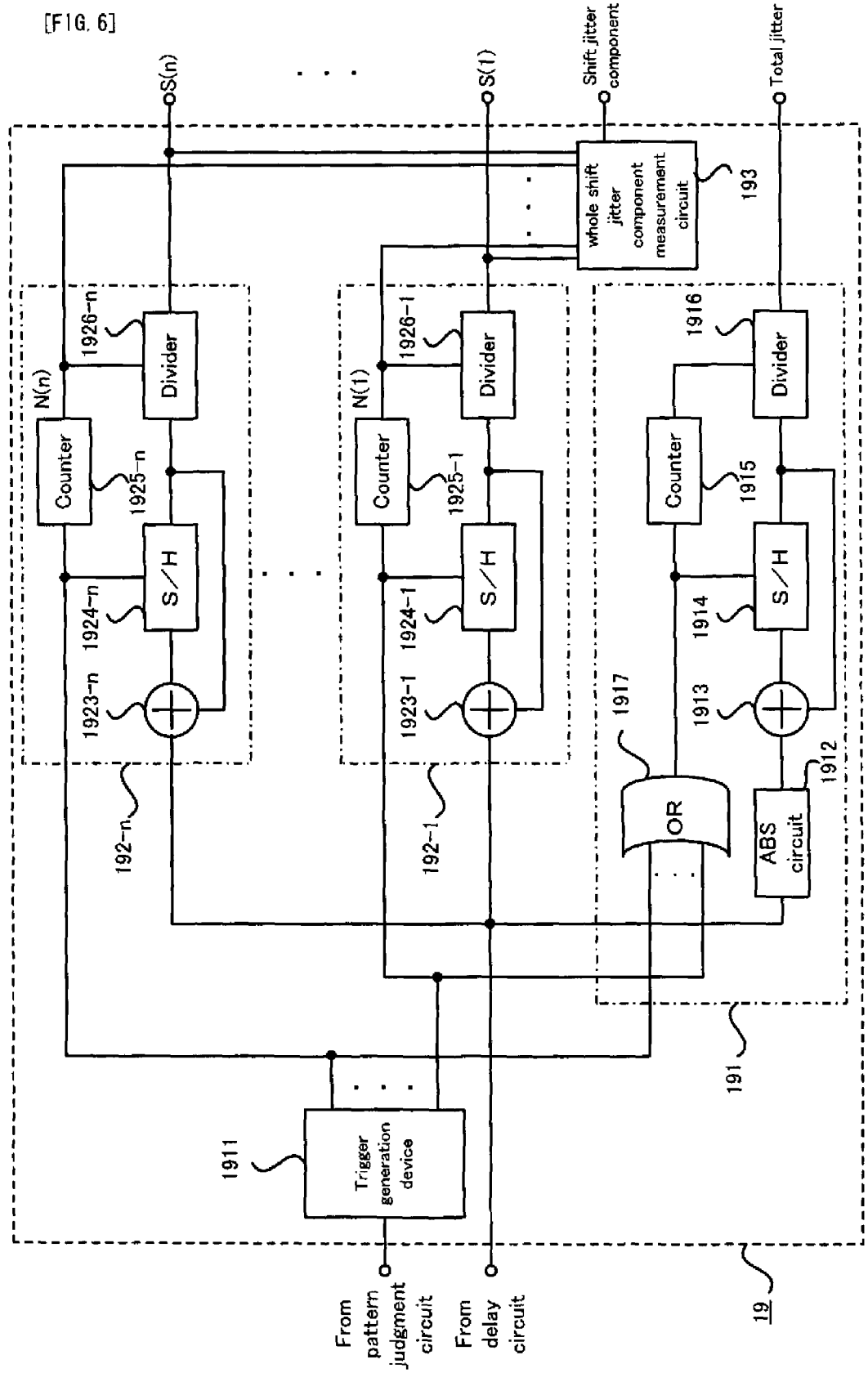
[FIG. 6]

[FIG. 7]
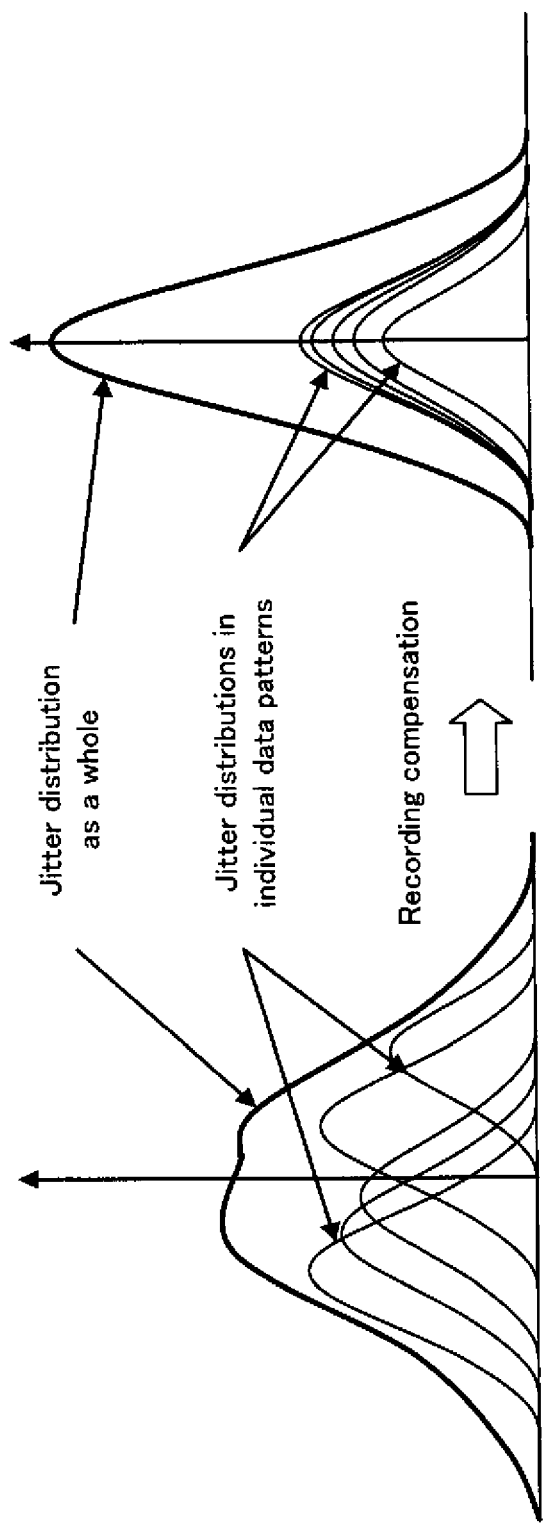

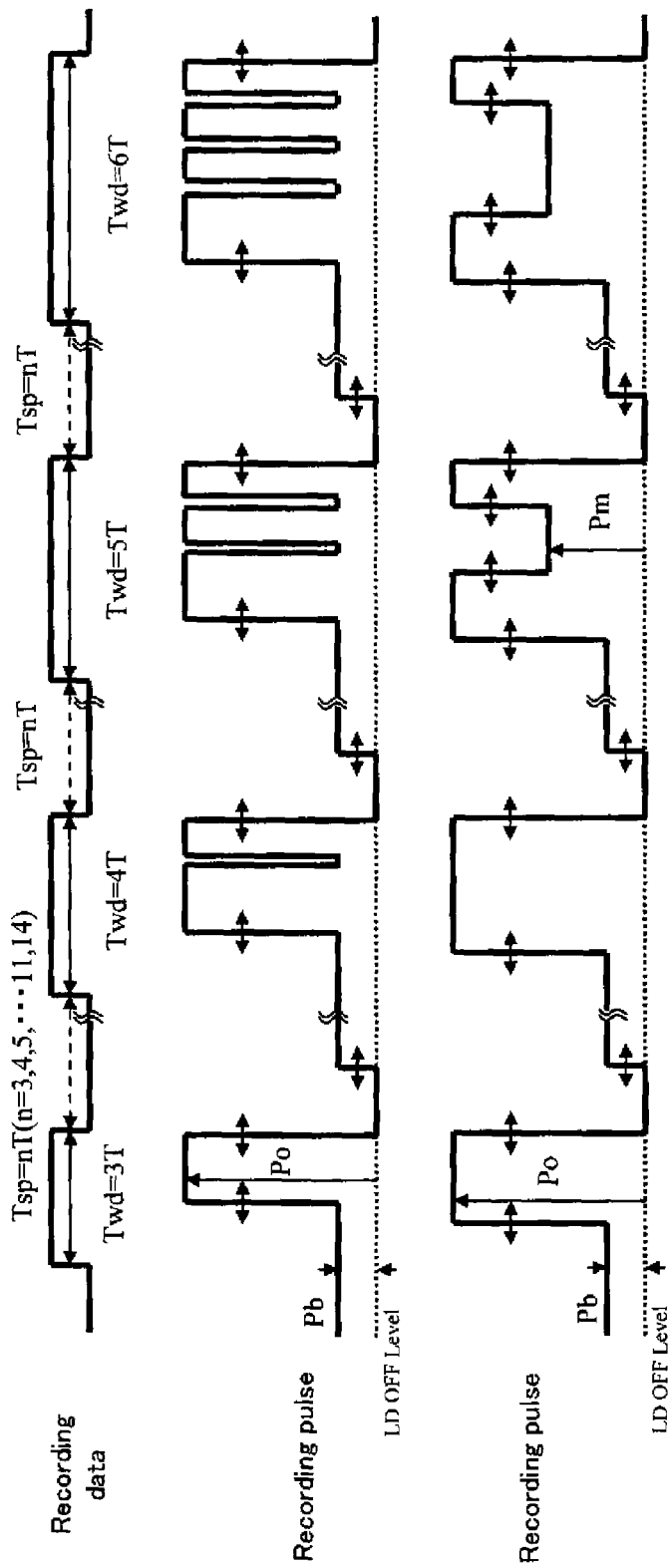
[FIG. 8]

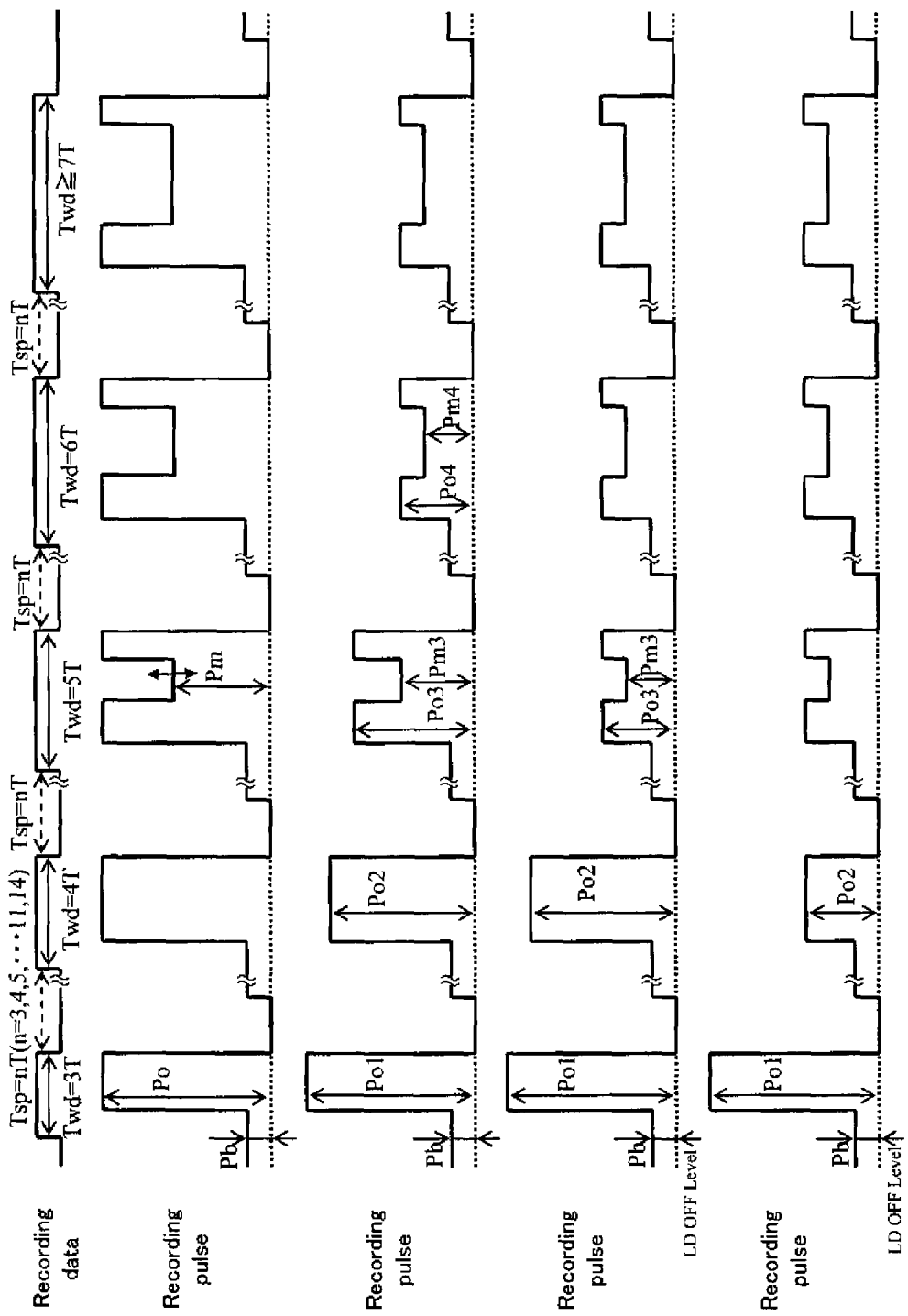
[FIG. 9]

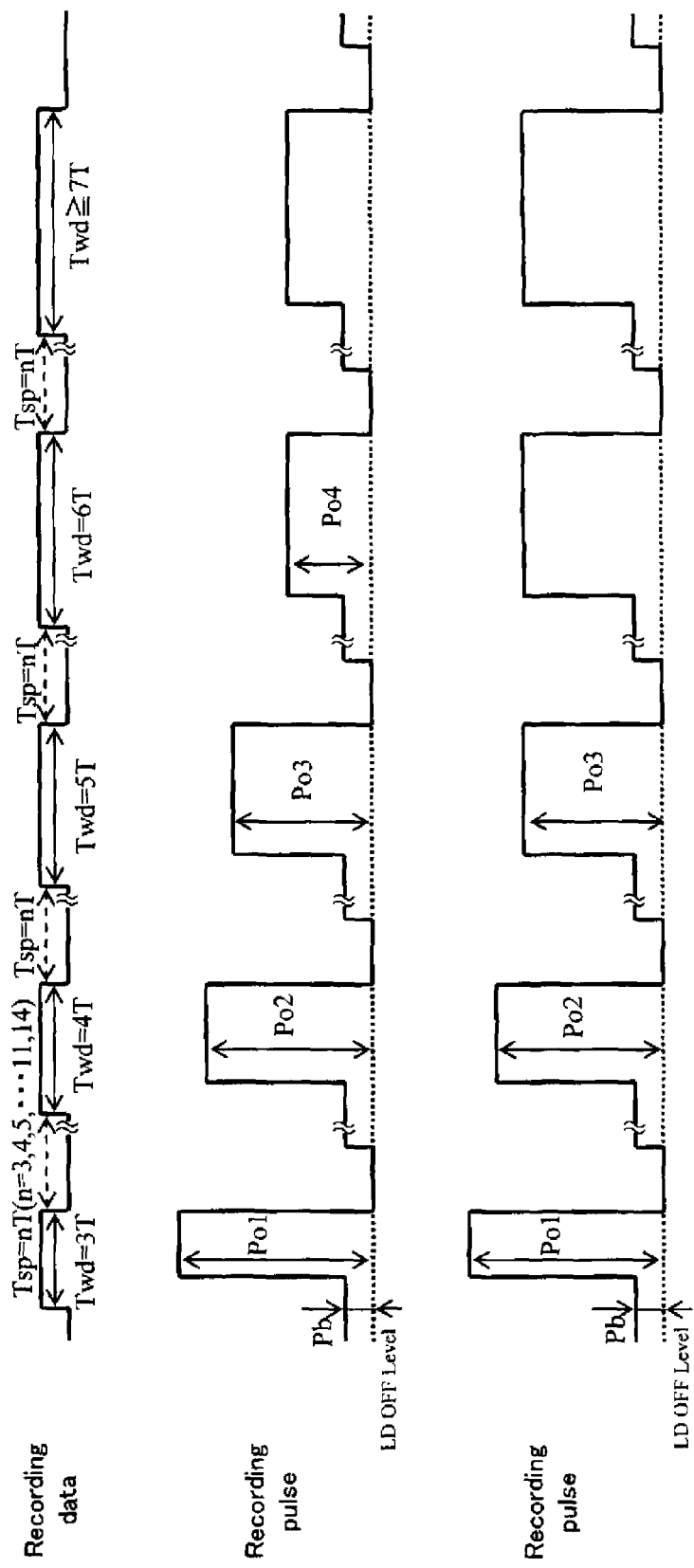
[FIG. 10]

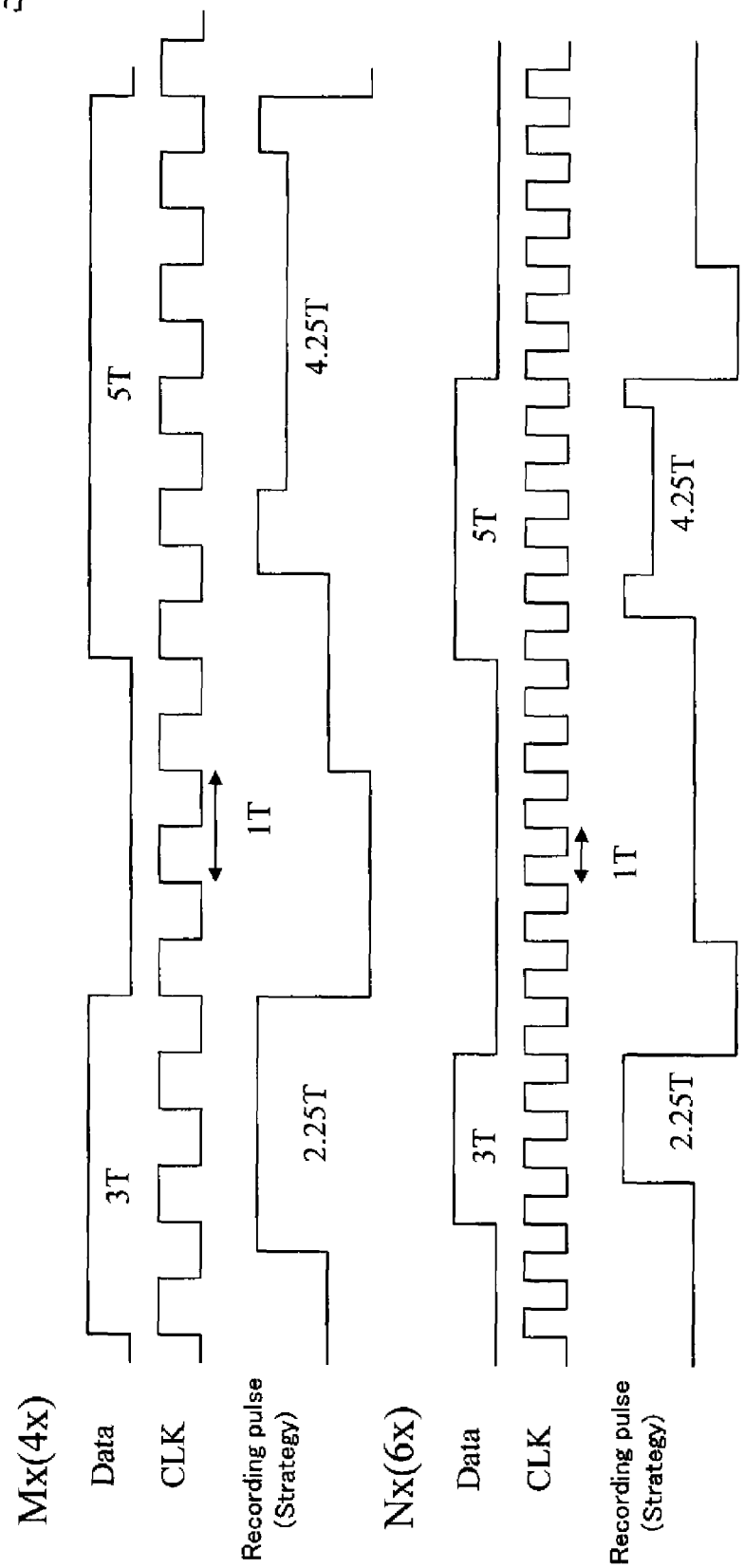

[FIG. 12]
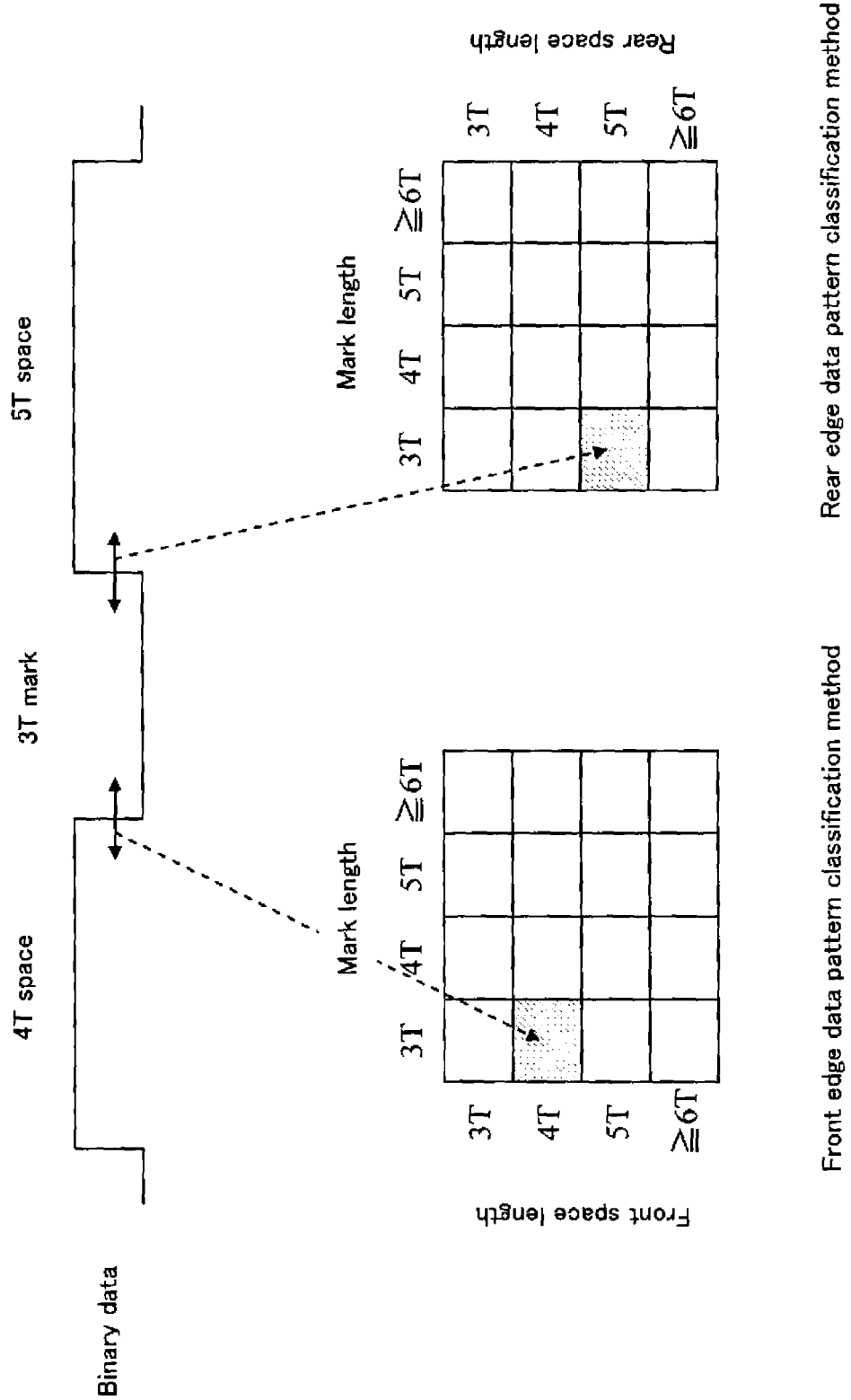

[FIG. 13]

Recording speed Mx(4x), Front edge difference compensation parameter:

|  | 3T | 4T | 5T | ≧6T |
|---|---|---|---|---|
| 3T | m(1) | m(2) | m(3) | m(4) |
| 4T | m(5) | m(6) | m(7) | m(8) |
| 5T | m(9) | m(10) | m(11) | m(12) |
| ≧6T | m(13) | m(14) | m(15) | m(16) |

Recording speed Mx(4x), Rear edge difference compensation parameter:

|  | 3T | 4T | 5T | ≧6T |
|---|---|---|---|---|
| 3T | m'(1) | m'(2) | m'(3) | m'(4) |
| 4T | m'(5) | m'(6) | m'(7) | m'(8) |
| 5T | m'(9) | m'(10) | m'(11) | m'(12) |
| ≧6T | m'(13) | m'(14) | m'(15) | m'(16) |

Recording speed Nx(6x), Front edge difference compensation parameter:

|  | 3T | 4T | 5T | ≧6T |
|---|---|---|---|---|
| 3T | n(1) | n(2) | n(3) | n(4) |
| 4T | n(5) | n(6) | n(7) | n(8) |
| 5T | n(9) | n(10) | n(11) | n(12) |
| ≧6T | n(13) | n(14) | n(15) | n(16) |

Recording speed Nx(6x), Rear edge difference compensation parameter:

|  | 3T | 4T | 5T | ≧6T |
|---|---|---|---|---|
| 3T | n'(1) | n'(2) | n'(3) | n'(4) |
| 4T | n'(5) | n'(6) | n'(7) | n'(8) |
| 5T | n'(9) | n'(10) | n'(11) | n'(12) |
| ≧6T | n'(13) | n'(14) | n'(15) | n'(16) |

[FIG. 14]
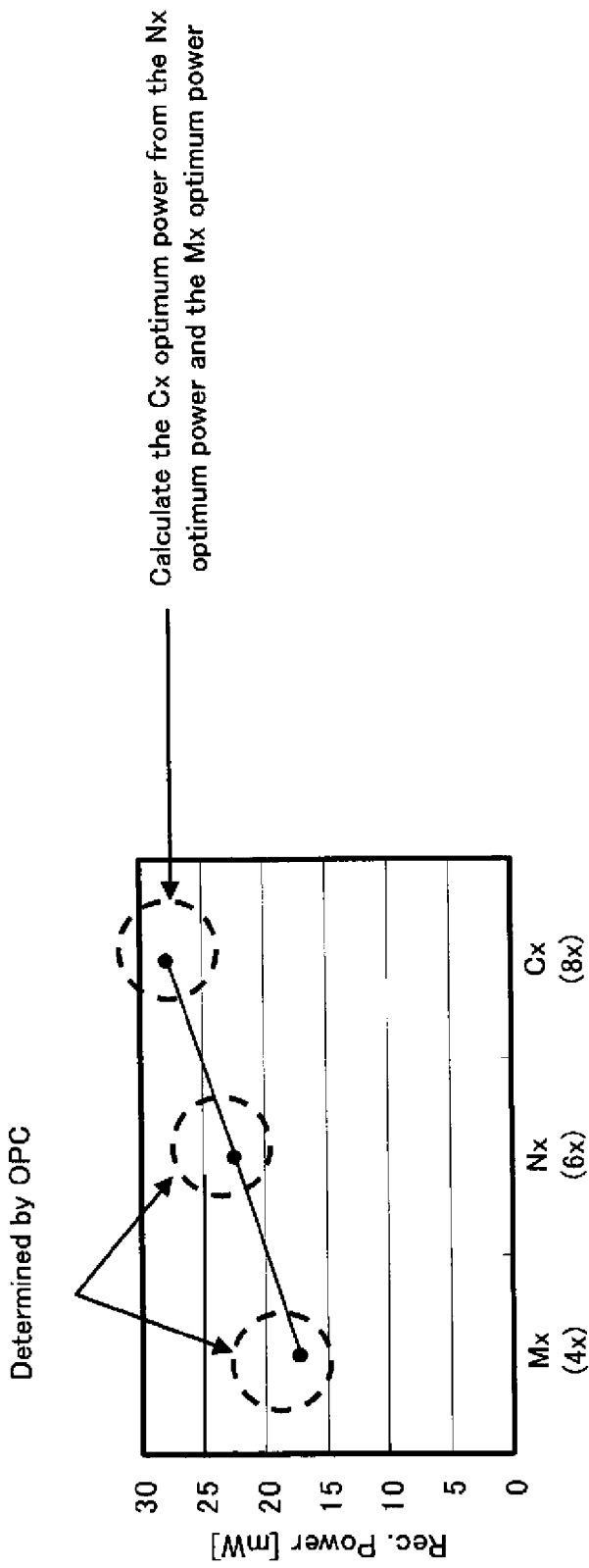

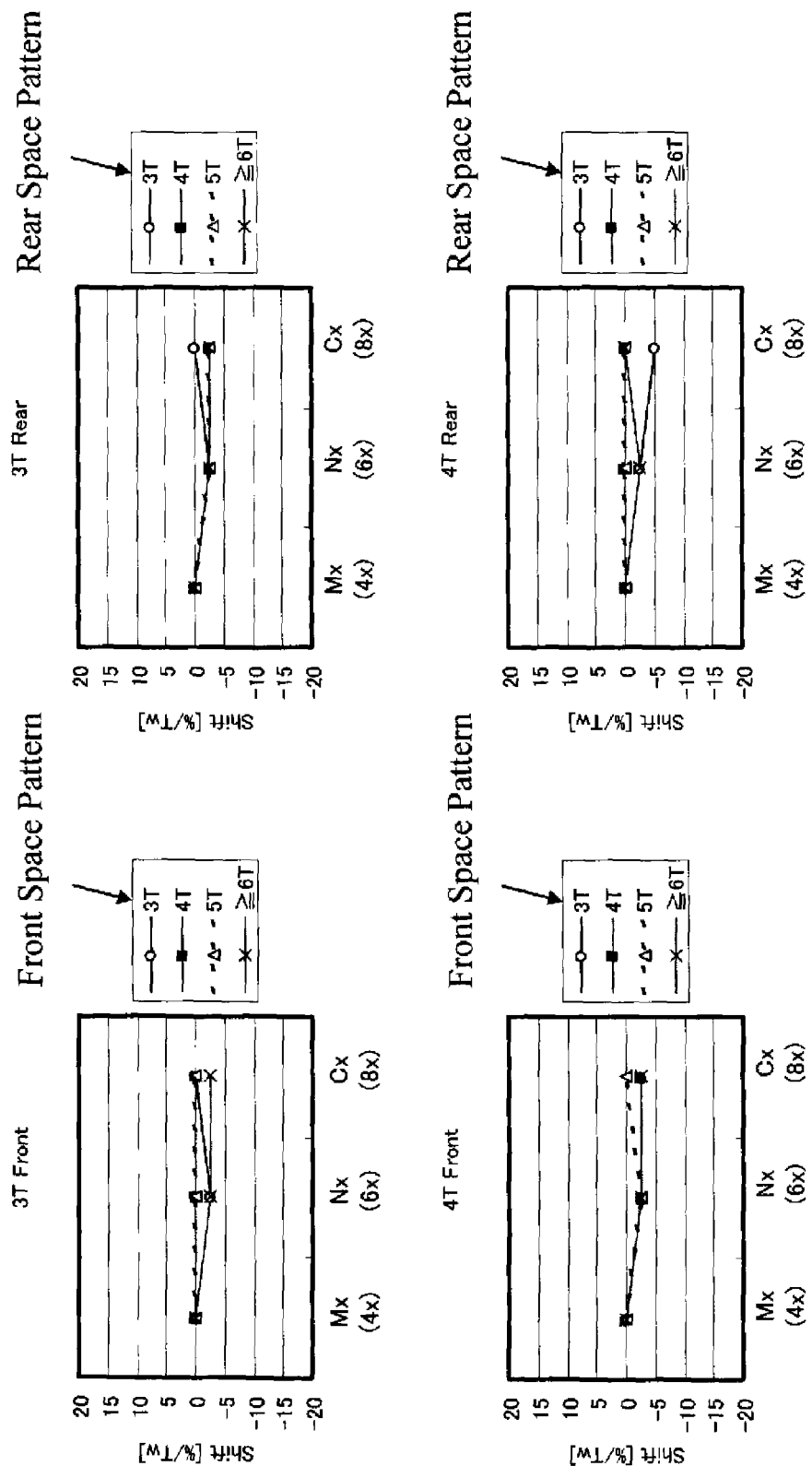
[FIG. 15]

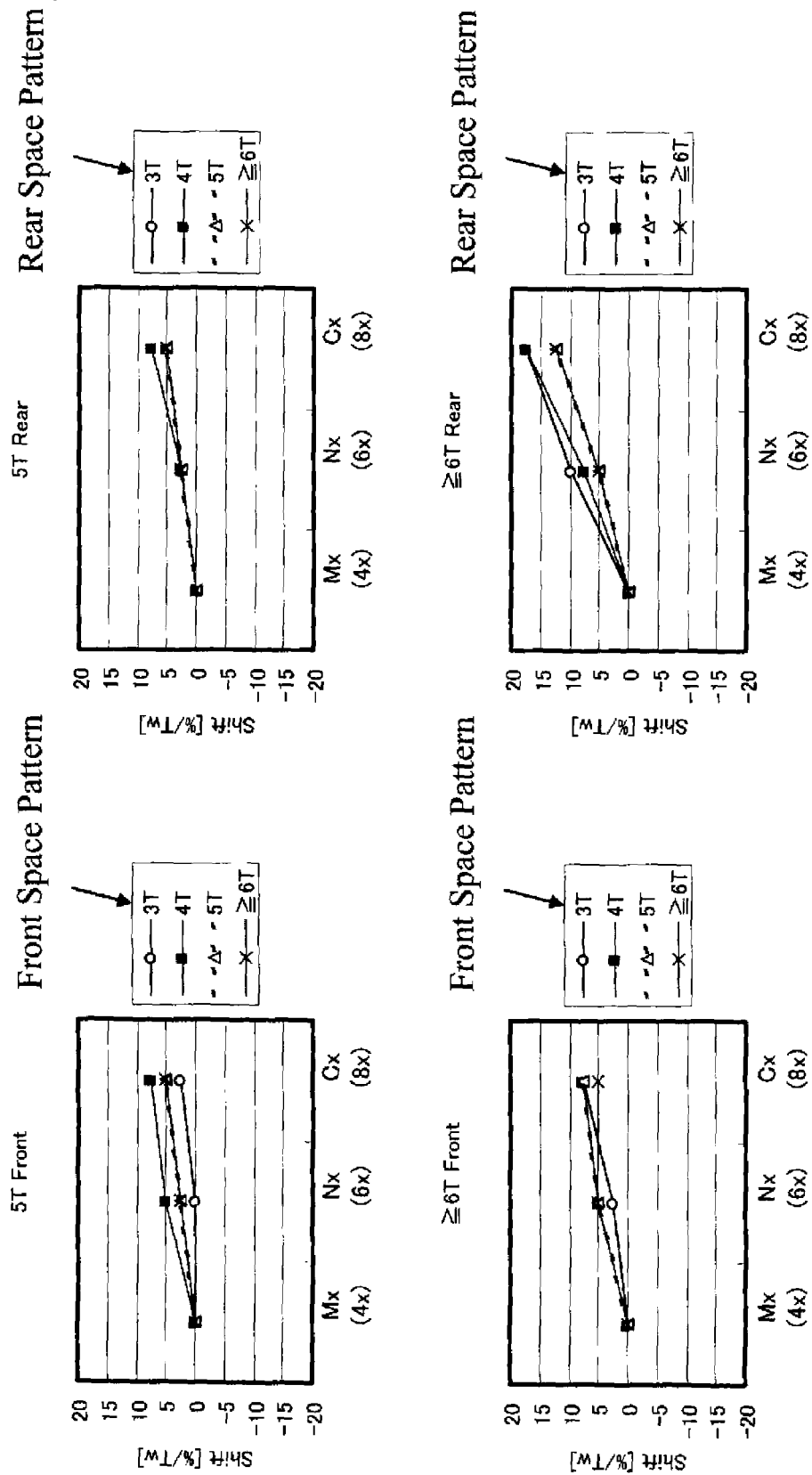
[FIG. 16]

[FIG. 17]
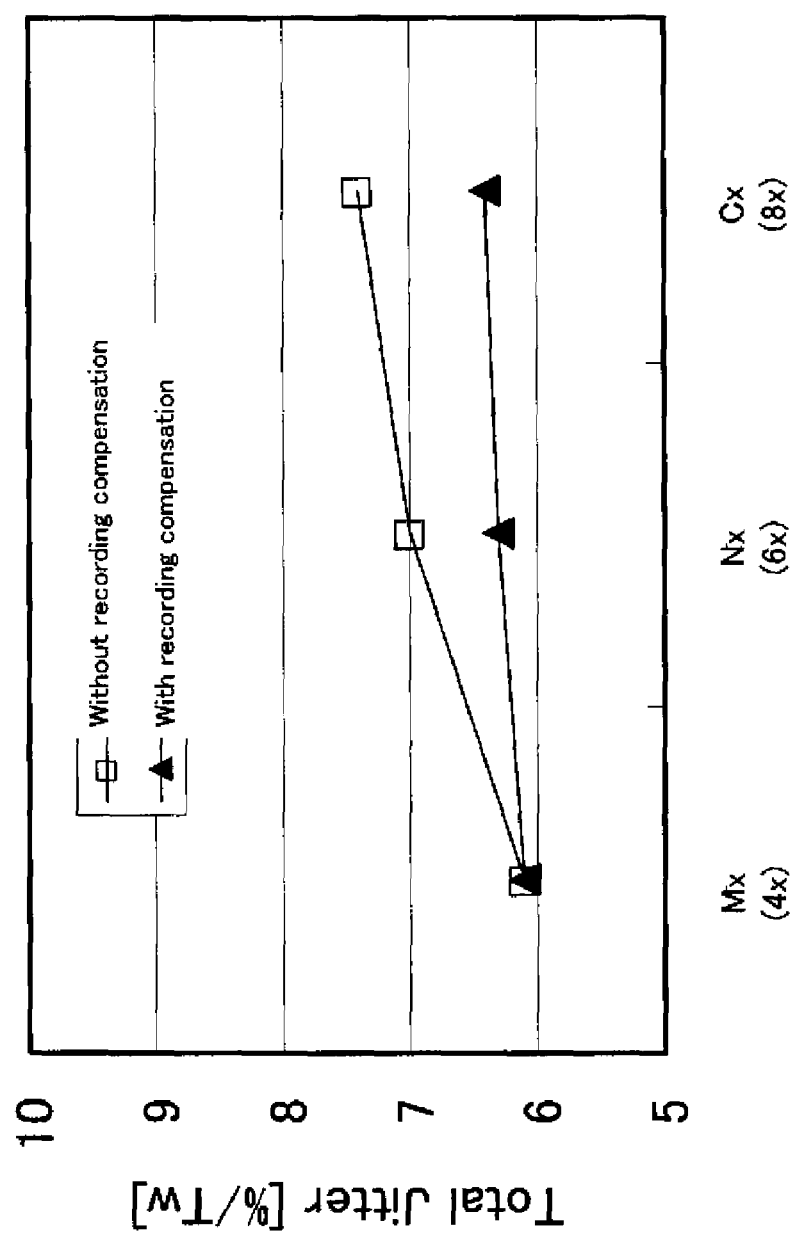

[FIG. 18]
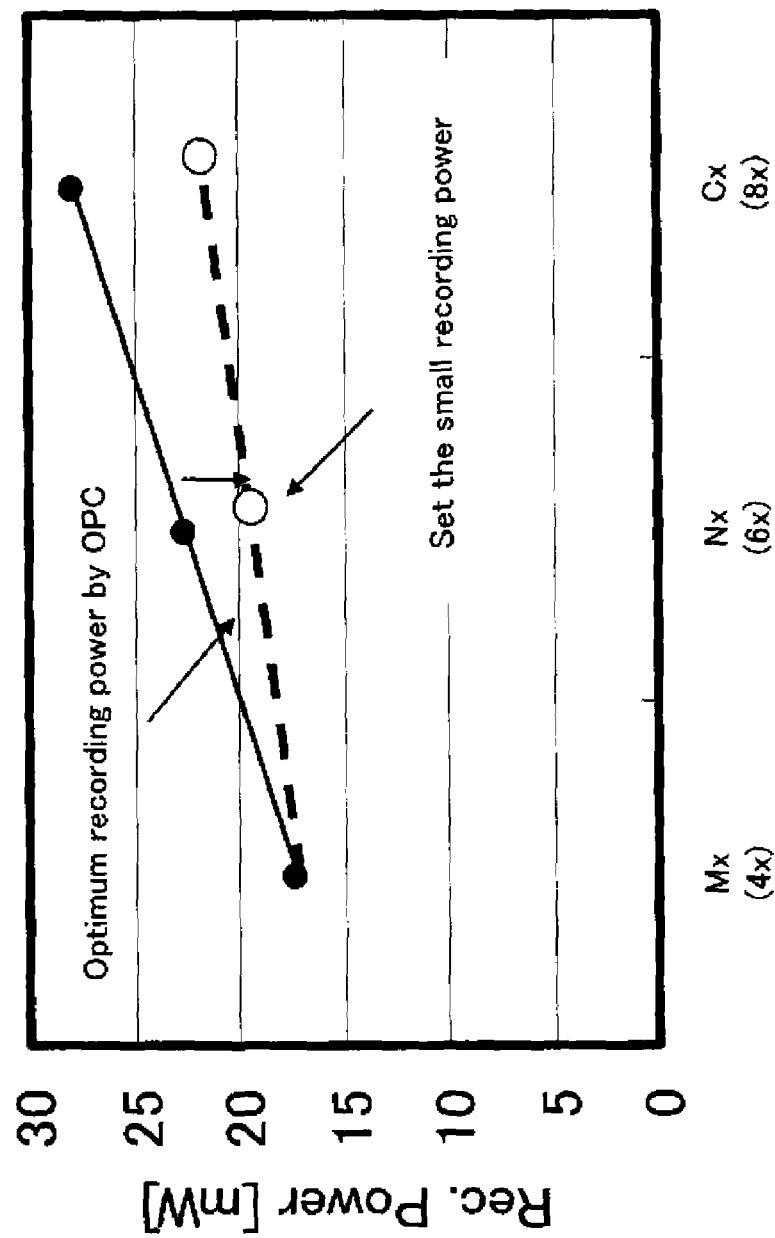

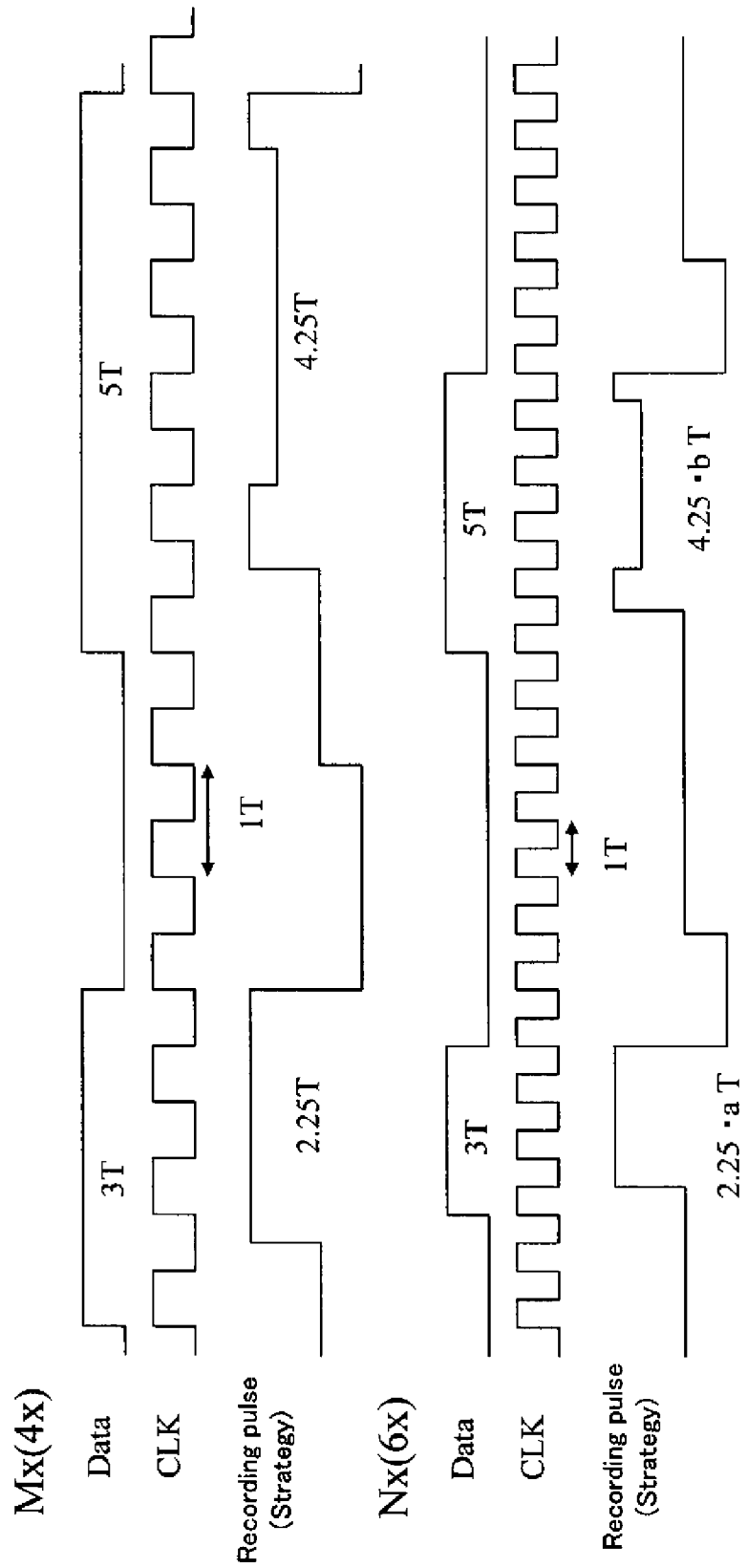
[FIG. 19]

[FIG. 20]
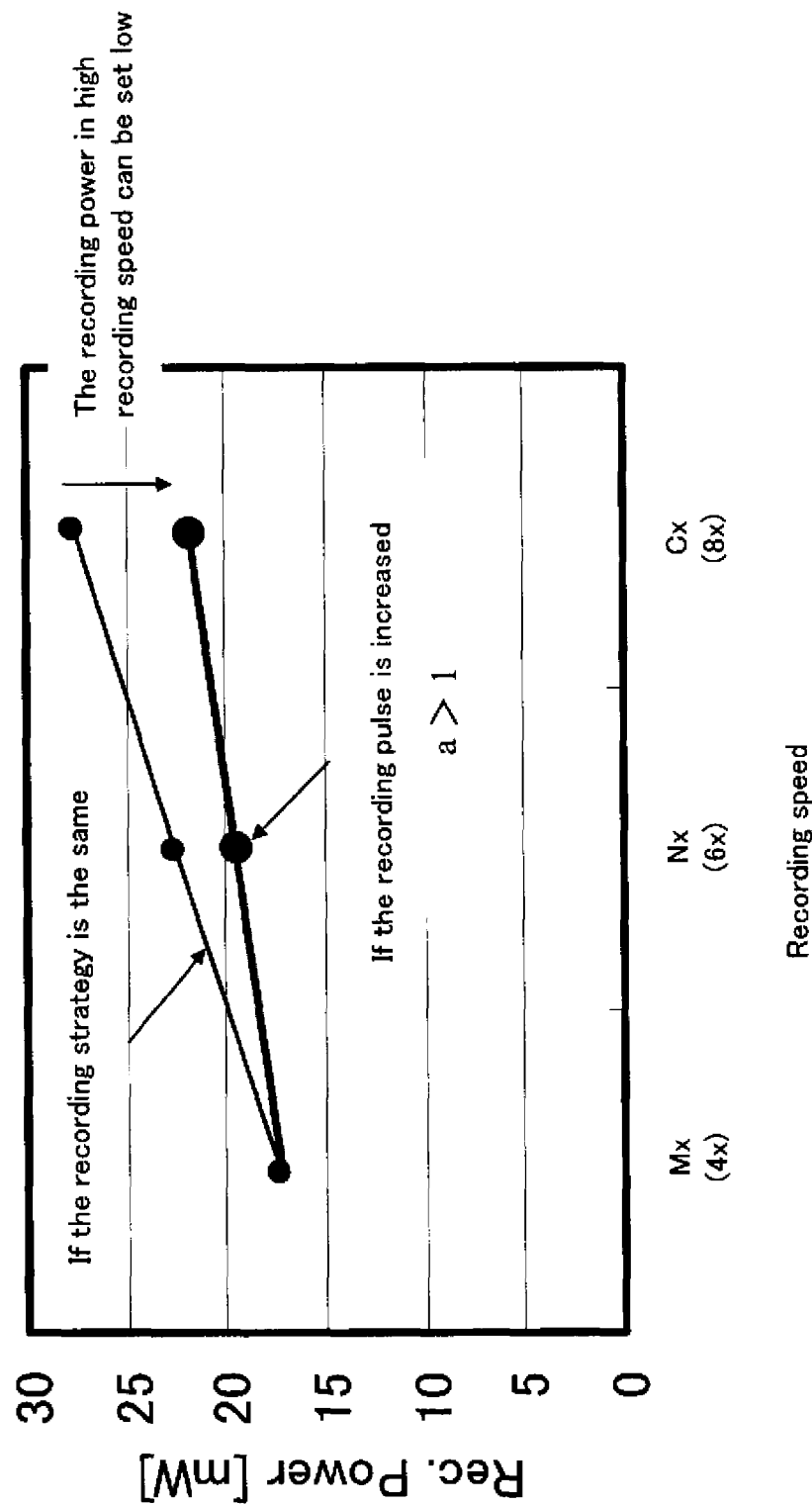

[FIG. 21]
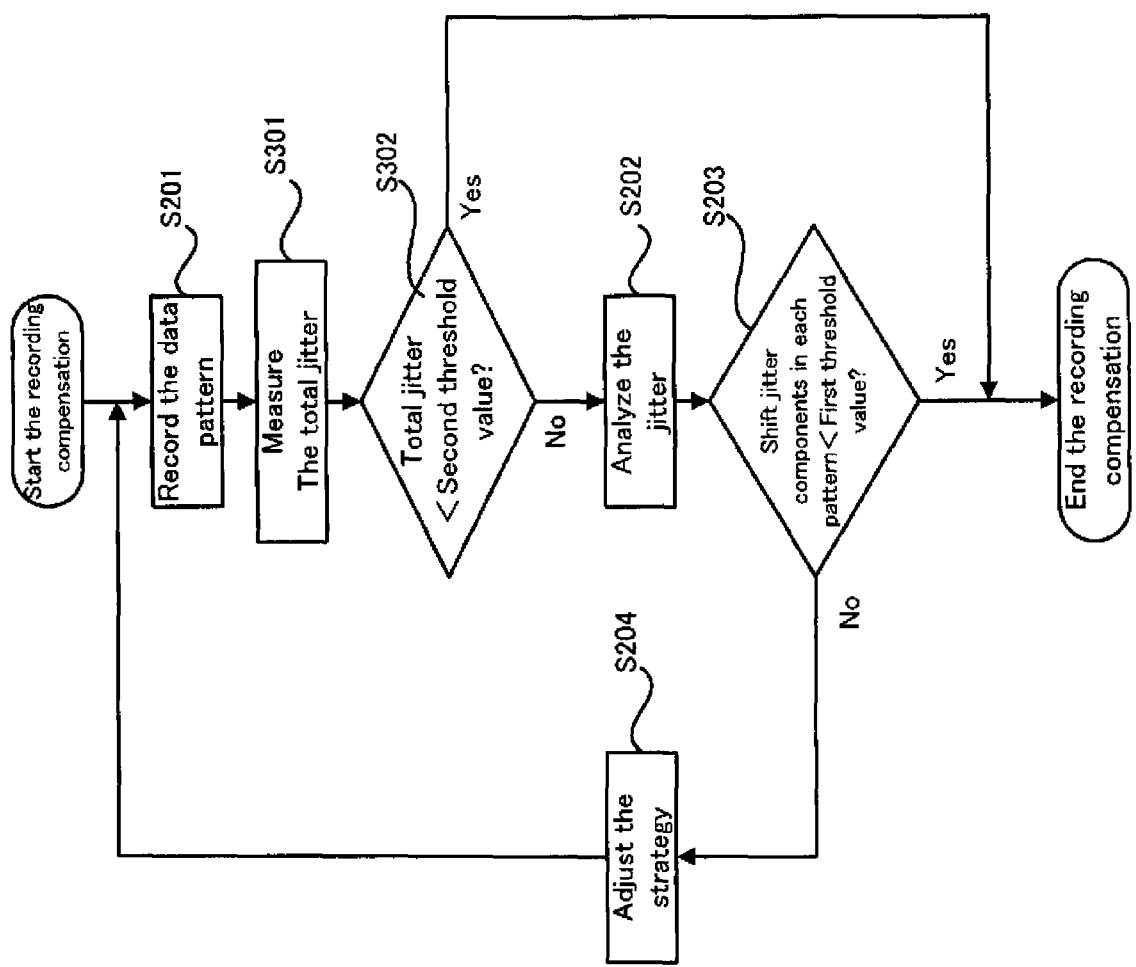

[FIG. 22]
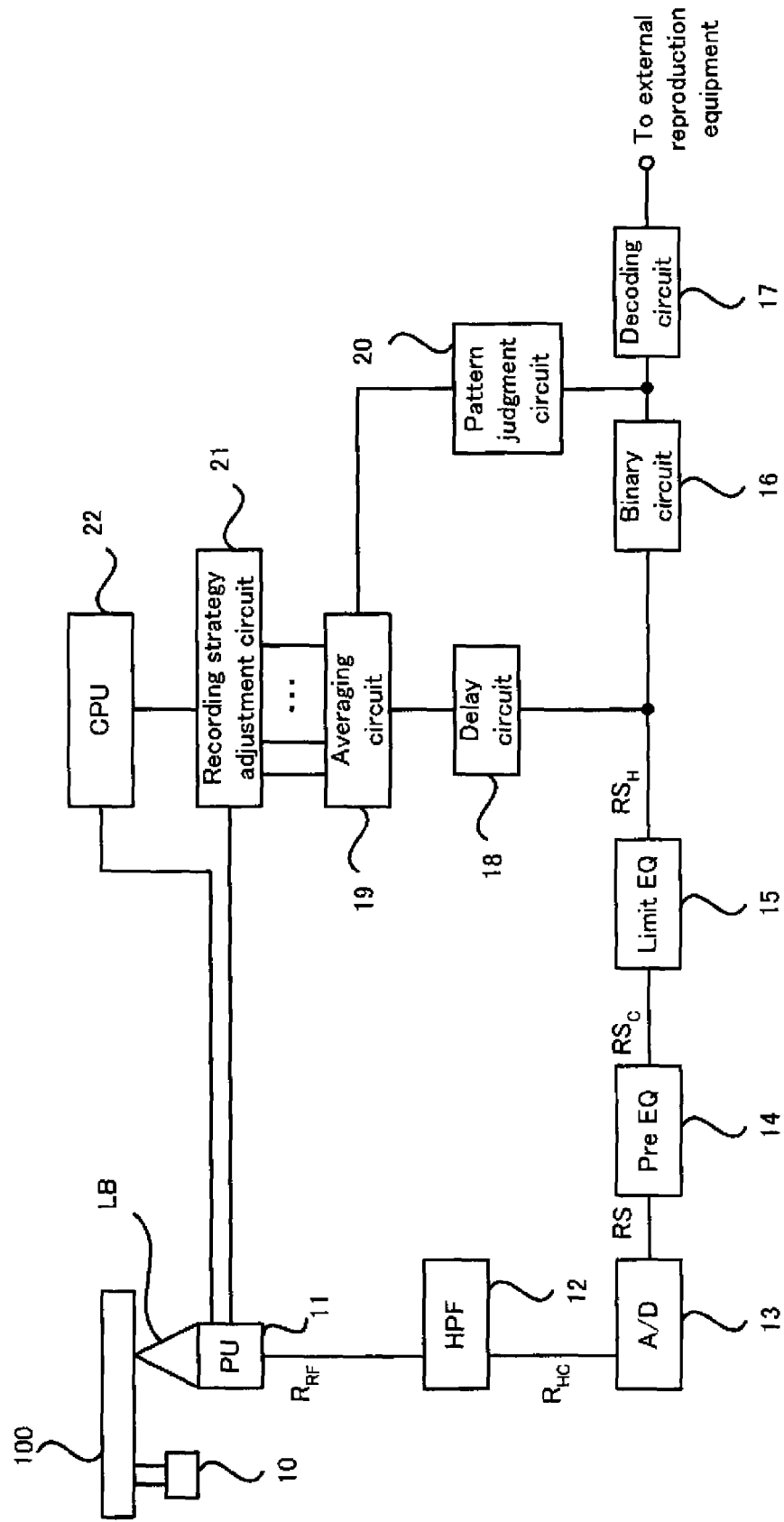

[FIG. 23]
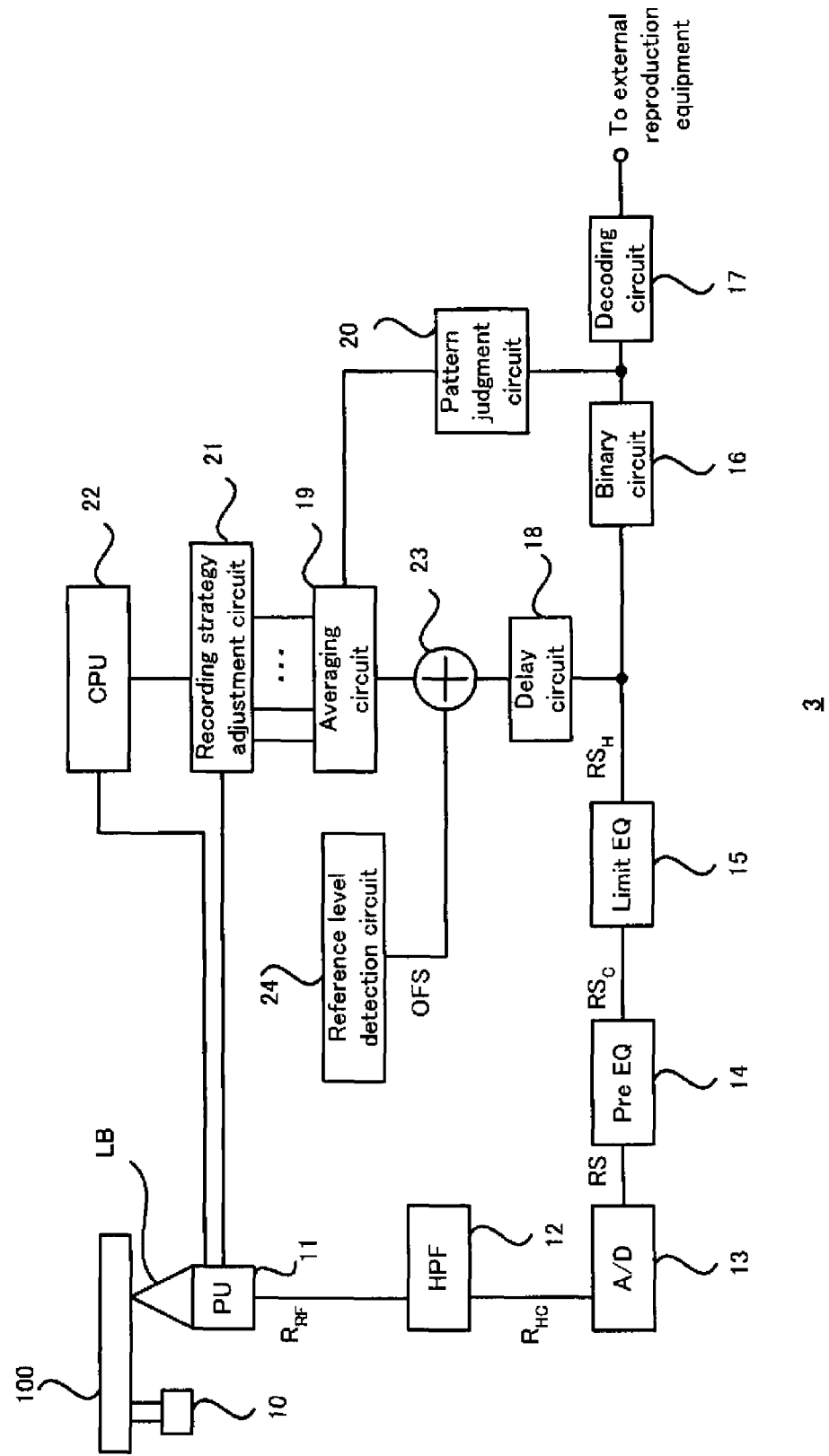

[FIG. 24]
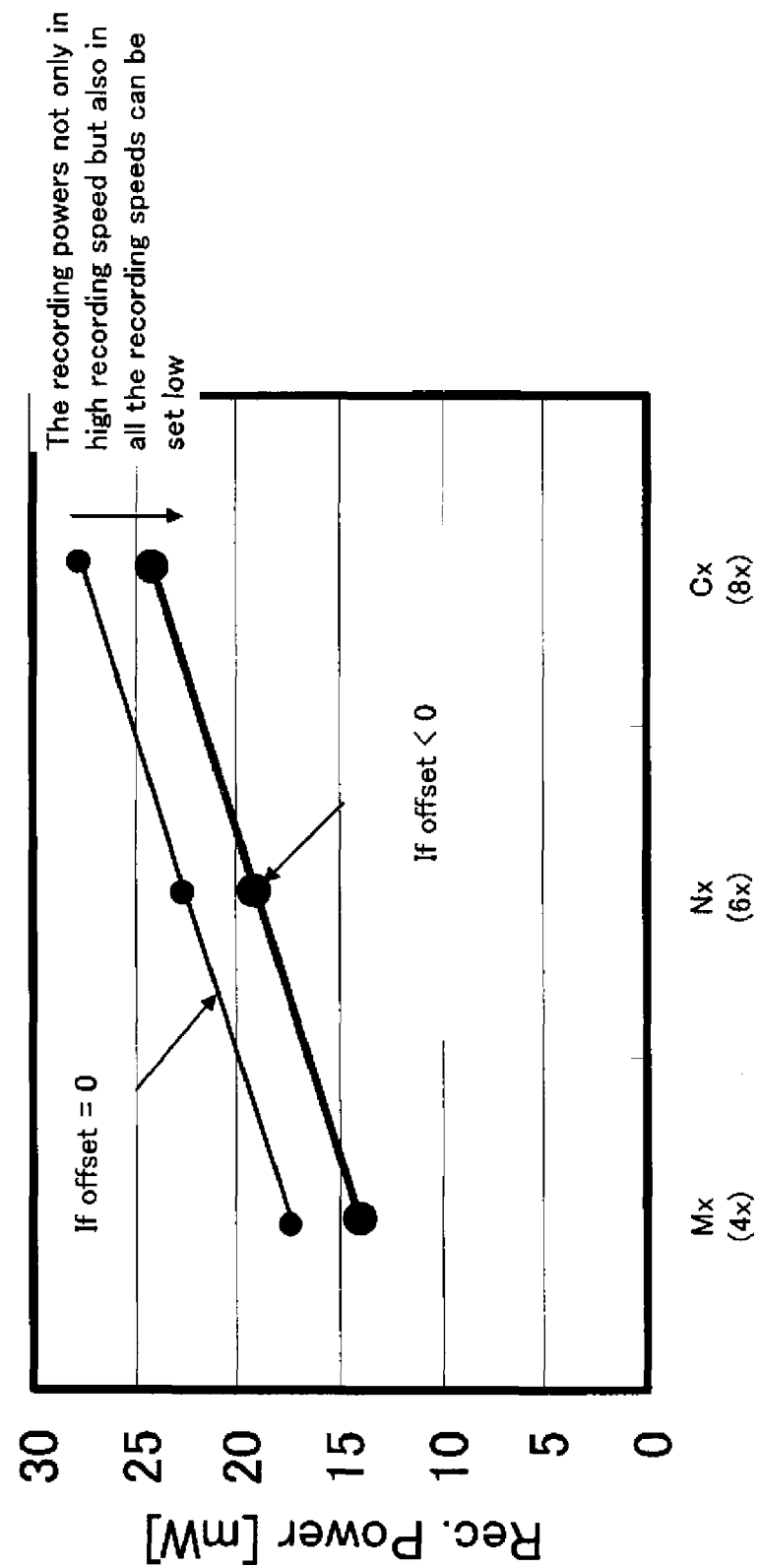

RECORDING DEVICE AND METHOD, AND COMPUTER PROGRAM, AND RECORDING MEDIUM

TECHNICAL FIELD

The present invention relates to a recording apparatus for and a recording method of recording a data pattern onto a recording medium, a computer program which makes a computer function as such a recording apparatus, and the recording medium.

BACKGROUND ART

Optical discs such as a DVD and a Blu-ray disc have been rapidly spread. In such optical discs, a data pattern is recorded onto a recording surface by applying a laser beam onto the recording surface. Thus, it is necessary to perform a recording compensation operation which is an operation of providing an appropriate strategy of the laser beam (i.e. shape or waveform of a recording pulse) in order to perform optimum recording. A patent document 1 discloses one example of the recording compensation operation. Specifically, the patent document 1 discloses the recording compensation operation in which an optimum strategy in high-speed recording (i.e. an optimum strategy when the recording is performed at high linear velocity) and an optimum strategy in low-speed recording (i.e. an optimum strategy when the recording is performed at low linear velocity) are obtained by test writing, thereby estimating an optimum strategy when the recording is performed at intermediate linear velocity. By this, the optimum strategies at all the recording speeds can be obtained even if the optimum strategies at all the recording speeds are hardly obtained by the test writing.

Patent document 1: Japanese Patent Application Laid Open No. 2004-234699

DISCLOSURE OF INVENTION

Subject to be Solved by the Invention

In the aforementioned technology, waveform conversion which provides constant energy is performed thereby to obtain the recording waveform pulse of the optimum strategy in the recording at the intermediate speed. However, there is such a technical problem that the load of processing required for a recording apparatus in order to perform the waveform conversion which provides the constant energy is relatively large.

In view of the aforementioned problems, it is therefore an object of the present invention to provide, for example, a recording apparatus and method which can more preferably obtain the optimum strategy at an arbitrary recording speed, as well as a computer program and a recording medium.

Means for Solving the Subject

The above object of the present invention can be achieved by a recording apparatus for recording a data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

The above object of the present invention can be also achieved by a recording method of recording a data pattern onto a recording medium at an arbitrary recording speed, the recording method provided with: a first strategy calculating process of calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating process of calculating a second standard strategy used to record the data pattern at a second recording speed by performing a clock cycle conversion process according to a difference between the first recording speed and the second recording speed, which is different from the first recording speed, on the first standard strategy; a second power calculating process of calculating a second optimum power used to record the data pattern at the second recording speed, on the basis of a result of reading the data pattern recorded at the second recording speed; a third strategy calculating process of calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating process of calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

The above object of the present invention can be also achieved by a computer program for recording control and for controlling a computer provided in a recording apparatus for recording a data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy, the computer program making the computer function as at least one portion of the first strategy calculating device, the second strategy calculating device, the second power calculating device, the third strategy calculating device, and the fourth strategy calculating device.

The above object of the present invention can be also achieved by a first recording medium provided with a recording condition recording area to record therein recording condition information which directly or indirectly indicates a third optimum power calculated by a recording apparatus for recording a data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating the third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

The above object of the present invention can be also achieved by a second recording medium on which a data pattern is recorded by using a third optimum strategy calculated by a recording apparatus for recording the data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating the third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

The operation and other advantages of the present invention will become more apparent from the embodiments explained below.

BRIEF DESCRIPTION OF DRAWINGS

FIG. 1 is a block diagram conceptually showing the basic structure of a recording apparatus in a first example.

FIG. 2 is a schematic plan view showing the basic structure of an optical disc and a schematic conceptual view showing a recording area structure in the radial direction of the optical disc.

FIG. 3 is a flowchart conceptually showing a flow of operations in a first operation example of the recording apparatus in the first example.

FIG. 4 is a flowchart conceptually showing a flow of a recording compensation operation.

FIG. 5 is a waveform diagram conceptually showing an operation of measuring jitter by an averaging circuit, on a read sample value series.

FIG. 6 is a block diagram conceptually showing the basic structure of the averaging circuit.

FIG. 7 is a graph conceptually showing the states of shift jitter components in respective data patterns and a shift jitter component as a whole before recording compensation and the states of shift jitter components in respective data patterns and a shift jitter component as a whole after the recording compensation.

FIG. 8 is a timing chart conceptually showing a first aspect of a strategy adjustment operation.

FIG. 9 is a timing chart conceptually showing a second aspect of the strategy adjustment operation.

FIG. 10 is a timing chart conceptually showing a third aspect of the strategy adjustment operation.

FIG. 11 is a timing chart conceptually showing an aspect of a clock cycle conversion process in association with a data pattern, clock, and strategy.

FIG. 12 is an explanatory diagram showing a difference between a Nx standard strategy and a Nx optimum strategy, calculated for each of types of data patterns.

FIG. 13 is an explanatory diagram showing a difference between a Mx standard strategy and a Mx optimum strategy, and the difference between the Nx standard strategy and the Nx optimum strategy, calculated for each of the types of data patterns.

FIG. 14 is a graph conceptually showing an operation of calculating a Cx optimum power on the basis of a Mx optimum power and a Nx optimum power.

FIG. 15 is graphs showing, for each of run length patterns of a front space and for each recording speed, (i) a shift amount between the front edge of a 3T mark recorded in each of the Mx standard strategy, the Nx standard strategy, and the Cx standard strategy and the front edge of a 3T mark recorded in the Mx standard strategy, (ii) a shift amount between the front edge of a 4T mark recorded in each of the Mx standard strategy, the Nx standard strategy, and the Cx standard strategy and the front edge of a 4T mark recorded in the Mx standard strategy, (iii) a shift amount between the rear edge of the 3T mark recorded in each of the Mx standard strategy, the Nx standard strategy, and the Cx standard strategy and the rear edge of the 3T mark recorded in the Mx standard strategy, and (iv) a shift amount between the rear edge of the 4T mark recorded in each of the Mx standard strategy, the Nx standard strategy, and the Cx standard strategy and the rear edge of the 4T mark recorded in the Mx standard strategy.

FIG. 16 is graphs showing, for each of run length patterns of a rear space and for each recording speed, (i) a shift amount between the front edge of a 5T mark recorded in each of the Mx standard strategy, the Nx standard strategy, and the Cx standard strategy and the front edge of a 5T mark recorded in the Mx standard strategy, (ii) a shift amount between the front edge of a 6T or more mark recorded in each of the Mx standard strategy, the Nx standard strategy, and the Cx standard strategy and the front edge of a 6T or more mark recorded in the Mx standard strategy, (iii) a shift amount between the rear edge of the 5T mark recorded in each of the Mx standard strategy, the Nx standard strategy, and the Cx standard strategy and the rear edge of the 5T mark recorded in the Mx standard strategy, and (iv) a shift amount between the rear edge of the 6T or more mark recorded in each of the Mx standard strategy, the Nx standard strategy, and the Cx standard strategy and the rear edge of the 6T or more mark recorded in the Mx standard strategy.

FIG. 17 is a graph conceptually showing a total jitter reduction effect in the first example.

FIG. 18 is a graph conceptually showing an optimum power in a second operation example.

FIG. 19 is a timing chart conceptually showing an aspect of a clock cycle conversion process in a third operation example in association with the data pattern, clock, and strategy.

FIG. 20 is a graph conceptually showing an optimum power in the third operation example.

FIG. 21 is a flowchart conceptually showing a flow of operations in a fourth operation example of the recording apparatus in the first example.

FIG. 22 is a block diagram conceptually showing the basic structure of an information recording apparatus in a second example.

FIG. 23 is a block diagram conceptually showing the basic structure of an information recording apparatus in a third example.

FIG. 24 is a graph conceptually showing an optimum power in the third operation example.

DESCRIPTION OF REFERENCE CODES 1, 2, 3 recording apparatus
10 spindle motor
11 pickup
12 HPF
13 A/D converter
14 pre-equalizer
15 limit equalizer
16 binary circuit
17 decoding circuit
18 delay circuit
19 averaging circuit
20 pattern judgment circuit
21 recording strategy setting circuit
22 CPU
23 adder
24 reference level detection device

BEST MODE FOR CARRYING OUT THE INVENTION

Hereinafter, as the best mode for carrying out the present invention, an explanation will be given on embodiments of the recording apparatus and method, the computer program, and the recording medium of the present invention.

(Embodiment of Recording Apparatus)

An embodiment of the recording apparatus of the present invention is a recording apparatus for recording a data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

According to the embodiment of the recording apparatus of the present invention, the recording medium is irradiated, for example, with a laser beam or the like, and as a result, the data pattern according to the data to be recorded is recorded onto the recording medium.

Here, on the recording apparatus of the embodiment, a recording compensation operation explained below is performed in parallel with the operation of recording the data pattern performed by the recording device (in particular, the operation of recording the data pattern into a user data area or a data recording area which are provided for the recording medium).

Firstly, by the operation of the first strategy calculating device, the recording operation for the recording compensation operation (i.e. a test writing operation for the recording compensation operation) is performed at the first recording speed, and the first optimum strategy is calculated which is an optimum strategy for recording the data pattern at the first recording speed. At this time, the first strategy calculating device records the data pattern by using an arbitrary initial strategy as the first standard strategy measures the jitter of the recorded data pattern, and adjusts the initial strategy such that the measured jitter satisfies the desired condition. As a result, the first optimum strategy is calculated.

Then, by the operation of the second strategy calculating device, the clock cycle conversion process is performed on the first standard strategy, and the second standard strategy is calculated. Here, by performing the clock cycle conversion process according to the difference between the first recording speed and the second recording speed, the second standard strategy for recording the data pattern at the second recording speed is calculated. Incidentally, the "clock cycle conversion process" in the embodiment corresponds to a process of converting the pulse width of a strategy at one recording speed and obtaining a strategy at other recording speed in accordance with a difference between clocks (e.g. a rate of change in the pulse width of the clock) at two different types of recording speeds (the one recording speed and the other recording speed). For example, if a rate of change between the pulse width of the clock at the first recording speed and the pulse width of the clock at the second recording speed is A % (wherein A is a real number), a process of changing the pulse width of the strategy at the first recording speed by approximately A % is listed as one example of the clock cycle conversion process.

Then, by the operation of the second power calculating device, the recording operation for determining the power of the laser beam (i.e. a test writing operation for determining the power) is performed at the second recording speed, and the second optimum power is calculated which is the optimum power of the laser for recording the data pattern at the second recording speed. Here, for example, such a power that asymmetry or a β value is optimal (e.g. that the asymmetry or β value of the data pattern recorded at the second recording speed is substantially the same as the asymmetry or β value of the data pattern recorded at the first recording speed) is calculated as the second optimum power.

Moreover, by the operation of the third strategy calculating device, the recording operation for the recording compensation operation (i.e. the test writing operation for the recording compensation operation) by the irradiation of the laser beam with the second optimum power and in the second standard strategy is performed at the second recording speed, and the second optimum strategy is calculated which is an optimum strategy for recording the data pattern at the second recording speed. At this time, the third strategy calculating device measures the jitter of the recorded data pattern and adjusts the second standard strategy such that the measured jitter satisfies the desired condition. As a result, the second optimum strategy is calculated.

Then, by the operation of the fourth strategy calculating device, the third optimum strategy which is an optimum strategy for recording the data pattern at the third recording speed is calculated on the basis of the difference between the first standard strategy and the first optimum strategy and the difference between the second standard strategy and the second optimum strategy. In other words, the third optimum strategy is calculated by an estimation process, an interpolation process, or the like, based on the difference between the first standard strategy and the first optimum strategy and the difference between the second standard strategy and the second optimum strategy.

By this, it is possible to calculate the third optimum strategy, without performing the test writing operation for the recording compensation operation at the third recording speed which is a higher speed, from the first optimum strategy and the second optimum strategy calculated by performing the test writing operation for the recording compensation operation at the first recording speed and the second recording speed. Thus, for example, it is effective particularly in calculating the optimum strategy for recording the data pattern at an unrealizable recording speed in the inner area of the recording medium (e.g. an inner PCA (Power Calibration Area) described later).

Moreover, particularly in the embodiment, in order to calculate the second optimum strategy, the recording operation for the recording compensation operation is performed by using the laser beam with the second optimum power which allows the asymmetry to be optimal. Thus, for a strategy of the second standard strategy for recording a short mark, the adjustment amount which allows the jitter to satisfy the desired condition is likely reduced or becomes zero (for example, if the second optimum power is selected to have the same asymmetry or β value as in the recording at the first recording speed, the adjustment amount for the short-mark strategy becomes zero). Thus, it is only necessary to adjust the strategy of the second standard strategy for recording at least one portion (e.g. a long mark) of the data pattern, and it is likely unnecessary to adjust the strategy of the second standard strategy for recording another portion (e.g. the short mark) of the data pattern. Thus, it is possible to relatively reduce the load of the recording compensation operation. In other words, unlike the technology presented in the background art, it is unnecessary to perform the complicated and high-load waveform conversion which provides the constant energy, so that it is possible to relatively reduce the load of the recording apparatus.

In one aspect of the embodiment of the recording apparatus of the present invention, the fourth strategy calculating device adjusts a third standard strategy obtained by performing the clock conversion process according to a difference between the first recording speed and the third recording speed on the first standard strategy, in accordance with a difference obtained by linearly interpolating the difference between the first standard strategy and the first optimum strategy and the difference between the second standard strategy and the second optimum strategy, thereby calculating the third optimum strategy.

According to this aspect, it is possible to calculate the third optimum strategy, relatively easily, by using that the difference between the standard strategy and the optimum strategy at the third recording speed can be calculated by linearly interpolating the difference between the standard strategy and the optimum strategy at each of the first recording speed and the second recording speed.

In an aspect of the recording apparatus in which the third standard strategy is adjusted as described above, the data pattern may include a first-length mark, and a second-length space and a third-length space which are located before and after the first-length mark, and the fourth strategy calculating device may adjust a strategy of the third standard strategy for recording the first-length mark before and after which the second-length space and the third-length space are located, on the basis of each of (i) a shift amount of edges on both ends of a strategy of the first optimum strategy for recording the first-length mark before and after which the second-length space and the third-length space are located with respect to edges on both ends of a strategy of the first standard strategy for recording the first-length mark before and after which the second-length space and the third-length space are located and (ii) a shift amount of edges on both ends of a strategy of the second optimum strategy for recording the first-length mark before and after which the second-length space and the third-length space are located with respect to edges on both ends of a strategy of the second standard strategy for recording the first-length mark before and after which the second-length space and the third-length space are located.

By virtue of such construction, it is possible to preferably calculate the third optimum strategy including the strategy for recording any data pattern.

In an aspect of the recording apparatus in which the third standard strategy is adjusted as described above, if the first recording speed is a M-times speed, if the second recording speed is a N-times speed, if the third recording speed is a C-times speed, if the shift amount of the edges on the both ends of the strategy of the first optimum strategy for recording the first-length mark before and after which the second-length space and the third-length space are located is m1(k) and m2(k), and if the shift amount of the edges on the both ends of the strategy of the second optimum strategy for recording the first-length mark before and after which the second-length space and the third-length space are located with respect to the edges on the both ends of the strategy of the second standard strategy for recording the first-length mark before and after which the second-length space and the third-length space are located is n1(k) and n2(k), then the fourth strategy calculating device may shift each of edges on both ends of the strategy of the third standard strategy for recording the first-length mark before and after which the second-length space and the third-length space are located, by respective one of (n1(k)−m1(k))×C/(N−M)+(N×m1(k)−M×n1(k))/(N−M) and (n2(k)−m2(k))×C/(N−M)+(N×m2(k)−M×n2(k))/(N−M).

By virtue of such construction, it is possible to preferably calculate the third optimum strategy including the strategy for recording any data pattern.

In another aspect of the embodiment of the recording apparatus of the present invention, the first standard strategy is the first optimum strategy.

According to this aspect, it is unnecessary to separately prepare the first standard strategy and thus it is unnecessary to calculate the difference between the first standard strategy and the first optimum strategy, so that the processes of the recording apparatus can be relatively simplified. In other words, in this aspect, the recording compensation operation is performed at the second recording speed, not by using the result of the recording compensation operations performed separately and independently at the two different recording speeds, but by using the strategy obtained by converting the result of the recording compensation operation performed at the first recording speed. Therefore, the recording compensation operation can be performed more preferably.

In another aspect of the embodiment of the recording apparatus of the present invention, it is further provided with: a first power calculating device for calculating a first optimum power used to record the data pattern at the first recording speed on the basis of a result of reading the data pattern recorded at the first recording speed; and a third power calculating device for calculating a third optimum power used to record the data pattern at the third recording speed on the basis of the first optimum power and the second optimum power.

According to this aspect, by linearly interpolating the optimum power at each of the first recording speed and the second recording speed, it is possible to calculate the optimum power at the third recording speed, relatively easily.

In another aspect of the embodiment of the recording apparatus of the present invention, the clock cycle conversion process enables a shape of the second standard strategy with respect to a clock at the second recording speed to be similar to a shape of the first standard strategy with respect to a clock at the first recording speed.

According to this aspect, if the rate of change between the pulse width of the clock at the first recording speed and the pulse width of the clock at the second recording speed is B % (wherein B is a real number), a process of changing the pulse width of the strategy at the first recording speed by B % is performed as the clock cycle conversion process.

Incidentally, it is obvious that the clock cycle conversion process is performed not only if the strategies at the first recording speed and the second recording speed are targeted but also if the strategy at the third recording speed is targeted.

In another aspect of the embodiment of the recording apparatus of the present invention, the clock cycle conversion process enables a shape of the second standard strategy with respect to a clock at the second recording speed to be similar to a shape of the first standard strategy with respect to a clock at the first recording speed, and the clock cycle conversion process increases or reduces a pulse width of a predetermined pulse included in the second standard strategy at a predetermined ratio.

According to this aspect, if the rate of change between the pulse width of the clock at the first recording speed and the pulse width of the clock at the second recording speed is C % (wherein C is a real number), a process of changing the pulse width of the strategy at the first recording speed by (C+α)% (wherein α is a real number) is performed as the clock cycle conversion process.

In particular, by changing the pulse width of the strategy at the first recording speed by the rate of change between the pulse width of the clock at the first recording speed and the pulse width of the clock at the second recording speed or by greater than the rate of change, it is possible to relatively reduce the third optimum power when the data pattern is recorded at the third recording speed which is a relatively high speed. This allows the longevity of a laser diode or the like for applying the laser beam. Alternatively, if the recording medium is of a rewritable type, this can prevent the deterioration of a recording surface.

In another aspect of the embodiment of the recording apparatus of the present invention, the clock cycle conversion process converts the first standard strategy at a different rate in each of lengths of marks included in the data pattern.

According to this aspect, a degree of changing a strategy for recording one mark and a degree of changing a strategy for recording another mark are changed, as occasion demands.

In another aspect of the embodiment of the recording apparatus of the present invention, the second power calculating device calculates, as the second optimum power, a power calculated by performing OPC (Optimum Power Control) for adjusting a power used to record the data pattern in the second standard strategy at the second recording speed such that asymmetry or a β value of a reproduction signal in reproducing the data pattern recorded at the second recording speed and in the second standard strategy is equal to asymmetry or a β value of a reproduction signal in reproducing the data pattern recorded at the first recording speed and in the first optimum strategy by performing the OPC (Optimum Power Control).

According to this aspect, for the strategy of the second standard strategy for recording the short mark, the adjustment amount which allows the jitter to satisfy the desired condition is reduced or becomes zero In an aspect of the recording apparatus in which the power calculated by performing the OPC is calculated as the second optimum power as described above, the third strategy calculating device may adjust a strategy of the second standard strategy for recording the data pattern of at least a long mark, thereby calculating the second optimum strategy.

By virtue of such construction, as described above, it is only necessary to adjust the strategy of the second standard strategy for recording at least one portion (e.g. the long mark) of the data pattern, so that it is possible to relatively reduce the load of the recording compensation operation.

In an aspect of the recording apparatus in which the power calculated by performing the OPC is calculated as the second optimum power as described above, the second power calculating device may calculate a power which is reduced from a power calculated by performing the OPC (Optimum Power Control), as the second optimum power.

By virtue of such construction, it is also possible to relatively reduce the third optimum power calculated by the linear interpolation. This allows the longevity of a laser diode or the like for applying the laser beam. Alternatively, if the recording medium is of a rewritable type, this can prevent the deterioration of a recording surface.

In another aspect of the embodiment of the recording apparatus of the present invention, the first strategy calculating device calculates the first optimum strategy which allows a shift jitter component caused by a state of the recorded data pattern from among the jitter to satisfy the desired condition, and the third strategy calculating device calculates the second optimum strategy which allows a shift jitter component caused by a state of the data pattern recorded of the jitter to satisfy the desired condition.

According to this aspect, not a random jitter component, which is hardly predicted or which cannot be predicted, but the shift jitter component which is caused by the state of the data pattern and which depends on the strategy is measured. Therefore, it is possible to preferably perform the recording compensation operation such that the shift jitter component satisfies the desired condition (i.e. to preferably calculate the optimum strategy such that the shift jitter component satisfies the desired condition), relatively easily.

In an aspect of the recording apparatus in which the optimum strategy which allows the shift jitter component to satisfy the desired condition is calculated, as described above, a state in which the jitter satisfies the desired condition may be a state in which the shift jitter component is less than or equal to a first predetermined value.

By virtue of such construction, it is possible to preferably perform the recording compensation operation so as to reduce the shift jitter component (i.e. to preferably calculate the optimum strategy such that the shift jitter component satisfies the desired condition).

In an aspect of the recording apparatus in which the optimum strategy which allows the shift jitter component to satisfy the desired condition is calculated, as described above, a state in which the jitter satisfies the desired condition may be a state in which a ratio of a random jitter component, which is caused by a noise from among the jitter, to the jitter is greater than or equal to a second predetermined value.

The jitter is indicated by the square root of a sum of the square of the random jitter component and the square of the shift jitter component. Thus, if the random jitter component is greater than the shift jitter component (i.e. if the ratio of the random jitter component to the jitter is relatively large), the jitter is hardly reduced even if the shift jitter component is reduced. Therefore, by virtue of such construction, it is possible to perform the recording compensation operation such that a jitter-reduction effect is preferably achieved (i.e. to preferably calculate the optimum strategy such that a jitter-reduction effect is preferably achieved). In other words, it is possible to preferably avoid the inefficient recording compensation operation in which the jitter-reduction effect is not preferably achieved.

In an aspect of the recording apparatus in which the optimum strategy which allows the shift jitter component to satisfy the desired condition is calculated, as described above, a state in which the jitter satisfies the desired condition is a state in which the shift jitter components in a plurality of types of respective data patterns with different run lengths may be substantially same to each other.

By virtue of such construction, it is possible to match the shift jitter components in a plurality of types of respective data patterns (e.g. 10 types of data patterns with run lengths of 3T to 11T and 14T if the information recording medium is a DVD, and 7 types of data patterns with run lengths of 2T to 9T if the information recording medium is a Blu-ray Disc). In other words, instead of narrowing jitter distributions in the respective data patterns, it is possible to match the average values of the jitter distributions in the respective data patterns (i.e. the shift jitter components). By this, it is possible to perform the recording compensation operation which reduces the jitter, preferably and relatively easily.

In another aspect of the embodiment of the recording apparatus of the present invention, it is further provided with: a reading device for reading the data pattern, thereby obtaining a read signal; and a measuring device for measuring jitter of the read signal, each of the first strategy calculating device and the third strategy calculating device calculating the first optimum strategy or the second optimum strategy which allows the jitter measured by the measuring device to satisfy the desired condition.

According to this aspect, it is possible to preferably calculate the first optimum strategy or the second optimum strategy with reference to the jitter measured by the measuring device.

In an aspect of the recording apparatus provided with the reading device, as described above, it is further provided with: an amplitude limit filtering device for limiting an amplitude level of the read signal by using a predetermined amplitude limit value, thereby obtaining a amplitude limit signal and for performing a high-frequency emphasis filtering process on the amplitude limit signal, thereby obtaining an equalization-corrected signal; and a detecting device for detecting the data pattern of the equalization-corrected signal, the measuring device measuring jitter of the equalization-corrected signal as the jitter of the read signal, each of the first strategy calculating device and the third strategy calculating device calculating the first optimum strategy or the second optimum strategy which allows the jitter measured by the measuring device to satisfy the desired condition, with reference to the data pattern detected by the detecting device.

According to this aspect, by the operation of the amplitude limit filtering device, the amplitude level of the read signal is limited. Specifically, in a signal component of the read signal whose amplitude level is greater than an upper limit of the amplitude limit value or whose amplitude level is less than a lower limit of the amplitude limit value, its amplitude level is limited to the upper limit or the lower limit of the amplitude limit value. On the other hand, in a signal component of the read signal whose amplitude level is less than or equal to the upper limit of the amplitude limit value or whose amplitude level is greater than or equal to the lower limit of the amplitude limit value, its amplitude level is not limited. As described above, the read signal whose amplitude level is limited is referred to as the amplitude limit signal. Moreover, the amplitude limit filtering device performs the high-frequency emphasis filtering process on the amplitude limit signal. As a result, the equalization-corrected signal is obtained in which the shortest data pattern included in the read signal (e.g. the data pattern with a run length of 3T if the information recording medium is a DVD, and the data pattern with a run length of 2T if the information recording medium is a Blu-ray Disc) has an emphasized amplitude level. In other words, the amplitude limit filtering device performs the same operation as a so-called limit equalizer, on the read signal.

Then, by the operation of the measuring device, the jitter of the equalization-corrected signal is measured, instead of measuring the jitter of the read signal. In other words, in this aspect, instead of directly using the read signal obtained by reading the data pattern from the recording medium to measure the jitter, the equalization-corrected signal obtained by performing the amplitude limit process and the high-frequency emphasis filtering process on the read signal is used to measure the jitter.

Moreover, by the operation of the detecting device, the data pattern of the equalization-corrected signal is detected. More specifically, it is detected which run length the data pattern of the equalization-corrected signal has. The detected data pattern is referred to in the recording compensation operation (i.e. when the optimum strategy is calculated).

As described above, the data pattern is detected from the equalization-corrected signal in which the amplitude level of the shortest data pattern is emphasized by the operation of the amplitude limit filtering device (i.e. limit equalizer). Thus, in any state of the asymmetry of the read signal, it is possible to preferably prevent such a disadvantage that the shortest data pattern included in the read signal does not cross a zero level. As a result, the signal component associated with the shortest mark and the shortest space can be preferably detected. By this, it is possible to preferably calculate the optimum strategy with reference to the read signal including the shortest data pattern. In other words, regardless of the state of the asymmetry in the read signal obtained by reading the data pattern recorded before the optimum strategy is calculated, it is possible to preferably calculate the optimum strategy.

In another aspect of the embodiment of the recording apparatus in which the reading signal is provided, as described above, it is further provided with an adding device for adding a predetermined offset signal to the read signal, thereby obtaining an offset-added signal, the measuring device measuring the jitter of the offset-added signal.

According to this aspect, in accordance with the addition of the offset signal, it is possible to set the asymmetry of the read signal obtained by reading the data pattern recorded in the optimum strategy, regardless of the state of the asymmetry of the read signal obtained by reading the data pattern recorded before the optimum strategy is calculated, as detailed later with reference to the drawing.

In another aspect of the embodiment of the recording apparatus of the present invention, it is further provided with a recording device for recording recording condition information which directly or indirectly indicates the third optimum strategy onto the recording medium. In this case, the recording condition information is preferably recorded in association with identification information for identifying the recording apparatus.

According to this aspect, the identification information about the recording apparatus and the recording condition information are recorded on the recording medium. Thus, by reading the recording condition information, which corresponds to the identification information about the recording apparatus, from the recording medium when the data pattern is recorded by the recording apparatus, it is possible to receive the same various effects as those described above, in the recording operation performed on the recording medium, without performing the aforementioned operation of calculating the third optimum strategy again.

Moreover, even if the recording condition information is not recorded on the recording medium for the reason that the recording medium is blank or the like, in the embodiment, it is possible to preferably perform the aforementioned operation of calculating the third optimum strategy. Moreover, if the resulting recording condition information which directly or indirectly indicates the third optimum strategy is recorded on the recording medium in association with the identification information about the recording apparatus, it is possible to receive the same various effects as those described above, in the recording operation performed on the recording medium, without performing the aforementioned operation of calculating the third optimum strategy again.

In other words, according to this aspect, without performing the operation of calculating the third optimum strategy or with the operation of calculating the third optimum strategy performed at least once, it is possible to receive the same various effects as those described above, in the recording performed on the recording medium, without calculating the third optimum strategy on the corresponding recording apparatus again.

Incidentally, as the recording condition information which directly indicates the third optimum strategy, the third optimum strategy itself is listed as one example. Moreover, as the recording condition information which directly indicates the third optimum strategy, for example, the adjustment amount of the third standard strategy, the difference between the first standard strategy and the first optimum strategy, and the difference between the second standard strategy and the second optimum strategy are listed as one example.

(Embodiment of Recording Method)

An embodiment of the recording method of the present invention is a recording method of recording a data pattern onto a recording medium at an arbitrary recording speed, the recording method provided with: a first strategy calculating process of calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating process of calculating a second standard strategy used to record the data pattern at a second recording speed by performing a clock cycle conversion process according to a difference between the first recording speed and the second recording speed, which is different from the first recording speed, on the first standard strategy; a second power calculating process of calculating a second optimum power used to record the data pattern at the second recording speed, on the basis of a result of reading the data pattern recorded at the second recording speed; a third strategy calculating process of calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating process of calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

According to the embodiment of the recording method of the present invention, it is possible to receive the same various effects as those that can be received by the aforementioned embodiment of the recording apparatus of the present invention.

Incidentally, in response to the various aspects in the aforementioned embodiment of the recording apparatus of the present invention, the embodiment of the recording method of the present invention can also adopt various aspects.

(Embodiment of Computer Program)

An embodiment of the computer program of the present invention is a computer program for recording control and for controlling a computer provided in a recording apparatus for recording a data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy (i.e. the aforementioned embodiment of the recording apparatus of the present invention (including its various aspects)), the computer program making the is computer function as at least one portion of the first strategy calculating device, the second strategy calculating device, the second power calculating device, the third strategy calculating device, and the fourth strategy calculating device.

According to the embodiment of the computer program of the present invention, the aforementioned embodiment of the recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the aforementioned embodiment of the recording apparatus of the present invention, the embodiment of the computer program of the present invention can also adopt various aspects.

An embodiment of the computer program product of the present invention is a computer program product in a computer-readable medium for tangibly embodying a program of instructions executable by a computer provided in a recording apparatus for recording a data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy (i.e. the aforementioned embodiment of the recording apparatus of the present invention (including its various aspects)), the computer program product making the computer function as at least one portion of the first strategy calculating device, the second strategy calculating device, the second power calculating device, the third strategy calculating device, and the fourth strategy calculating device.

According to the embodiment of the computer program product of the present invention, the aforementioned embodiment of the recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the recording apparatus of the present invention.

Incidentally, in response to the various aspects in the aforementioned embodiment of the recording apparatus of the present invention, the embodiment of the computer program product of the present invention can also employ various aspects.

(Embodiment of Recording Medium)

A first embodiment of the recording medium of the present invention is a recording medium comprising a recording condition recording area to record therein recording condition information which directly or indirectly indicates a third optimum power calculated by a recording apparatus for recording a data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating the third optimum strategy used to record the data pattern at a third recording speed which is different from the first recording speed and the second recording speed, on the basis of each of a difference between the first standard strategy and the first optimum strategy and a difference between the second standard strategy and the second optimum strategy (i.e. the aforementioned embodiment of the recording apparatus of the present invention (including its various aspects)). In this case, the recording condition information is preferably recorded in association with the identification information for identifying the recording apparatus corresponding to the recording condition information.

A second embodiment of the recording medium of the present invention is a recording medium on which a data pattern is recorded by using a third optimum strategy calculated by a recording apparatus for recording the data pattern onto a recording medium at an arbitrary recording speed, the recording apparatus provided with: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating the third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

According to each of the embodiments of the recording medium of the present invention, the identification information about the recording apparatus and the recording condition information are recorded on the recording medium. Thus, by reading the recording condition information, which corresponds to the identification information about the recording apparatus, from the recording medium when the data pattern is recorded by the recording apparatus, it is possible to receive the same various effects as those described above, in the recording operation performed on the recording medium, without performing the aforementioned operation of calculating the third optimum strategy again.

Moreover, even if the recording condition information is not recorded on the recording medium for the reason that the recording medium is blank or the like, in the embodiment, it is possible to preferably perform the aforementioned operation of calculating the third optimum strategy.

Moreover, if the resulting recording condition information which directly or indirectly indicates the third optimum strategy is recorded on the recording medium in association with the identification information about the recording apparatus, it is possible to receive the same various effects as those described above, in the recording operation performed on the recording medium, without performing the aforementioned operation of calculating the third optimum strategy again next time the data pattern is recorded.

In other words, according to the embodiments, without performing the operation of calculating the third optimum strategy or with the operation of calculating the third optimum strategy performed at least once, it is possible to receive the same various effects as those described above, in the recording performed on the recording medium, without calculating the third optimum strategy on the corresponding recording apparatus again.

Incidentally, the recording condition may be recorded in advance on the recording medium, or it may be recorded along with the recording operation, as occasion demands.

Incidentally, in response to the various aspects in the aforementioned embodiment of the recording apparatus of the present invention, each of the embodiments of the recording medium of the present invention can also employ various aspects.

The operation and other advantages of the present invention will become more apparent from the examples explained below.

As explained above, according to the embodiment of the recording apparatus of the present invention, it is provided with the first strategy calculating device, the second strategy calculating device, the second power calculating device, the third strategy calculating device, and the fourth strategy calculating device. According to the embodiment of the recording method of the present invention, it is provided with the first strategy calculating process, the second strategy calculating process, the second power calculating process, the third strategy calculating process, and the fourth strategy calculating process. According to the embodiment of the computer program of the present invention, it makes a computer function as the embodiment of the recording apparatus of the present invention. According to the embodiment of the first recording medium of the present invention, it is provided with the recording condition recording area to record therein the recording condition information which directly or indirectly indicates the third optimum strategy calculated by the aforementioned recording apparatus. According to the second recording medium of the present invention, the data pattern is recorded by using the third optimum strategy calculated by the recording apparatus of the present invention described above. Therefore, it is possible to obtain the optimum strategy at an arbitrary recording speed, more preferably.

EXAMPLES

Hereinafter, examples of the present invention will be described with reference to the drawings.

(1) First Example

Firstly, with reference to FIG. 1 to FIG. 21, a first example of the recording apparatus of the present invention will be explained.

(1-1) Basic Structure

Firstly, with reference to FIG. 1, the basic structure of a recording apparatus in the first example will be described. FIG. 1 is a block diagram conceptually showing the basic structure of a recording apparatus 1 in the first example.

As shown in FIG. 1, the recording apparatus 1 in the first example is provided with a spindle motor 10, a pickup (PU) 11, a HPF (High Pass Filter) 12, an A/D converter 13, a pre-equalizer 14, a binary circuit 16, a decoding circuit 17, a delay circuit 18, an averaging circuit 19, a pattern judgment circuit 20, a recording strategy adjustment circuit 21, and a CPU 22.

The pickup 11 constitutes one specific example of the "recording device" and the "reading device" of the present invention. The pickup 11 photoelectrically converts reflected light when a laser beam LB is applied to a recording surface of an optical disc 100 rotated by the spindle motor 10, thereby generating a read signal $R_{RF}$. Moreover, the pickup 11 irradiates the recording surface of the optical disc 100 with the laser beam LB according to a recording strategy set on the recording strategy setting circuit 21, thereby recording a data pattern onto the optical disc 100.

The HPF 12 removes a low-frequency component of the read signal $R_{RF}$ outputted from the pickup 11, and it outputs a resulting read signal RHC to the A/D converter 13.

The A/D converter 13 samples the read signal $R_{RF}$ in accordance with a sampling clock outputted from a PLL (Phased Lock Loop) not illustrated or the like, and it outputs a resulting read sample value series RS to the pre-equalizer 14.

The pre-equalizer 14 removes intersymbol interference which is based on transmission characteristics in an information reading system which is formed of the pickup 11 and the optical disc 100, and it outputs a resulting read sample value series $RS_C$ to the binary circuit 16.

The binary circuit 16 performs a binary process on the read sample value series $RS_C$, and it outputs a resulting binary signal to each of the decoding circuit 17 and the pattern judgment circuit 19.

The decoding circuit 17 performs a decoding process or the like on the binary signal, and it outputs a resulting reproduction signal to external reproduction equipment such as a display and a speaker. As a result, data according to the data pattern recorded on the optical disc 100 (e.g. video data, audio data, and the like) is reproduced.

The delay circuit 18 applies a delay corresponding to a time required for the processes of the binary circuit 16 and the pattern judgment circuit 20 to the read sample value series $RS_C$, and then, it outputs the read sample value series $RS_C$ to the averaging circuit 19. In other words, by the operations of the delay circuit 18, each sample value in the read sample value series $RS_C$ outputted from the pre-equalizer 14 is inputted to the averaging circuit 19 in the same timing as the timing in which the data pattern judgment result of the sample value is inputted.

The averaging circuit 19 constitutes one specific example of the "measuring device" of the present invention. The averaging circuit 19 measures the jitter of the read sample value series $RS_C$. The details of the averaging circuit 19 will be detailed later (refer to FIG. 6).

The pattern judgment circuit 20 constitutes one specific example of the "detecting device" of the present invention. The pattern judgment circuit 20 judges the data pattern on the basis of the binary signal outputted from the binary circuit 16. Namely, it judges which data pattern the binary signal inputted to the pattern judgment circuit 20 is. The judgment result is outputted to the averaging circuit 19.

The recording strategy adjustment circuit 21 constitutes one specific example of the "first strategy calculating device" and the "third strategy calculating device" of the present invention, with the CPU 22. The recording strategy adjustment circuit 21 adjusts the recording strategy of each data pattern on the basis of the jitter measured on the averaging circuit 19. In other words, it performs a recording compensation operation.

The CPU 22 constitutes one specific example of the "first strategy calculating device", the "second strategy calculating device", the "first power calculating device", the "second power calculating device", the "third power calculating device", the "third strategy calculating device", and the "fourth strategy calculating device" of the present invention. The CPU 22 controls the aforementioned various constituents which constitute the recording apparatus 1, thereby controlling the operations of the recording apparatus 1 as a whole.

(1-2) Optical Disc

Next, with reference to FIG. 2, an explanation will be given on the basic structure of the optical disc 100 which is the target of the recording operation of the recording apparatus 1 in the first example. FIG. 2 is a schematic plan view showing the basic structure of the optical disc 100 and a schematic conceptual view showing a recording area structure in the radial direction of the optical disc 100.

As shown in FIG. 2, the optical disc 100 has a recording surface on a disc main body, for example, with a diameter of about 12 cm as in a DVD. On the recording surface, the optical disc 100 is provided with a center hole 101 as the center; an inner PCA (Power Calibration Area) 111 which constitutes one specific example of the "inner area" of the present invention; a RMA (Recording Management Area) 112; a lead-in area 113; a data recording area 114 which constitutes one specific example of the "user data area" of the present invention; a lead-out area 115; and an outer PCA 116. Moreover, for example, a groove track and a land track are alternatively provided, spirally or concentrically, centered on the center hole 101. Moreover, on the track, the data pattern is divided and recorded by a unit of ECC block. The ECC block is an error-correctable data management unit. Moreover, in the example, the optical disc 100 may be a recordable recording medium which can record the data pattern only once (i.e. DAO), or a rewritable recording medium which can record the data pattern a plurality of times.

Then, the groove track is oscillated with a constant amplitude and at a constant spatial frequency. In other words, the groove track is wobbled, and the cycle of the wobble is set to a predetermined value. On the land track, a pit referred to as a land pre-pit (LPP) is formed which indicates a pre-format address. By virtue of the two addressing (i.e. the wobble and the land pre-pit), it is possible to perform disc rotation control during the recording and to generate a recording clock, as well as obtaining information required for the recording of the data pattern, such as a recording address. Incidentally, the pre-format address may be recorded in advance by modulating the wobble of the groove track by a predetermined modulation method, such as frequency modulation and phase modulation.

(1-3) First Operation Example

Next, with reference to FIG. 3, an explanation will be given on a first operation example of the recording apparatus 1 in the first example (particularly, a recording compensation operation). FIG. 3 is a flowchart conceptually showing a flow of operations in the first operation example of the recording apparatus 1 in the first example.

As shown in FIG. 3, firstly, an OPC process is performed at a recording speed of Mx (wherein M≧1), under the control of the CPU 22 (step S101). In other words, an OPC pattern is recorded into the inner PCA 111 at the recording speed of Mx, thereby calculating the optimum power of the laser beam LB for recording the data pattern at the recording speed of Mx (hereinafter referred to as a "Mx optimum power" as occasion demands). Incidentally, the Mx optimum power corresponds to one specific example of the "first optimum power" of the present invention.

Incidentally, the recording speed of Mx is a realizable recording speed when the data pattern is recorded into the inner PCA 111. For example, if the optical disc 100 is a DVD, a recording speed of 4× is listed as one example as the recording speed of Mx.

Then, under the control of the CPU 22, the recording compensation operation is performed at the recording speed of Mx (step S102).

Now, with reference to FIG. 4, the recording compensation operation will be explained in more detail. FIG. 4 is a flowchart conceptually showing a flow of the recording compensation operation.

As shown in FIG. 4, firstly, under the control of the CPU 22, the data pattern for recording compensation is recorded into the inner PCA 111 at the recording speed of Mx by using a predetermined initial strategy (step S201).

Then, by the operation of the averaging circuit 19 controlled by the CPU 22, the jitter of the data pattern recorded in the step S201 is measured (step S202).

Here, with reference to FIG. 5 and FIG. 6, an explanation will be given on the operation in measuring the jitter and the averaging circuit 19 for measuring the jitter. FIG. 5 is a waveform diagram conceptually showing an operation of measuring the jitter by the averaging circuit 19, on the read sample value series $RS_C$. FIG. 6 is a block diagram conceptually showing the basic structure of the averaging circuit 19.

As shown in FIG. 5, in the first example, the averaging circuit 19 firstly measures a difference (i.e. an edge shift in an amplitude direction) between a zero level and a sample value (which is shown by a black circle and which will be hereinafter referred to as a "zero cross sample value" as occasion demands) in the vicinity of the zero cross point of the read sample value series $RS_C$, for each data pattern, in order to measure the jitter. If there is no intersymbol interference in the read signal $R_{RF}$, the sample value that approximately matches the zero level in the timing of a clock CLK becomes the zero cross sample value. If there is the intersymbol interference in the read signal $R_{RF}$, the sample value that is the closest to the zero level in the timing of the clock CLK is the zero cross sample value.

In order to perform such an operation, the averaging circuit 19 is provided with a trigger generation device 1911, a total jitter measurement block 191, n individual shift jitter component measurement blocks 192-1 to 192-n, and a whole shift jitter component measurement circuit 193, as shown in FIG. 6. The number of the individual shift jitter component measurement blocks 192-1 to 192-n is equal to the combination number of types of the data patterns. In other words, if the optical disc 100 is a DVD, there are 10 types of data run lengths (3T to 11T, and 14T). For each mark length, an individual shift jitter can be classified by using the combination pattern of front and rear space lengths. For example, there are 100 combinations of the front space length and each mark length, and there are 100 combinations of the rear space length and each mark: n=200 in total. In view of an effective pupil diameter and the data run length, the same intersymbol interference occurs in the combination patterns of the marks/spaces of 6T or more. Thus, if the data of 6T or more are treated as the same group, n can be reduced to n=32. If the optical disc 100 is a Blu-ray Disc, there are 8 types of data run lengths (2T to 9T), so that the combination patterns of the front and rear space lengths for each mark length is n=8*8*2=128 combinations. As in the DVD, in view of the effective pupil diameter and the data run length, if the data of 5T or more are treated as the same group, n can be reduced to n=32. Moreover, each of the individual shift jitter component measurement blocks 192-1 to 192-n measures corresponding one of the individual shift jitter components in the data patterns.

The read sample value series $RS_C$ outputted from the delay circuit 18 is inputted to an ABS circuit 1912 and n adders 1923-1 to 1923-n. Moreover, the pattern judgment result outputted from the pattern judgment circuit 20 is inputted to the trigger generation device 1911.

The trigger generation device 1911 generates a trigger signal which is distinguished in each data pattern and which is at high level (or low level) in timing in which the data pattern is inputted, in accordance with the pattern judgment result outputted from the pattern judgment circuit 20. The trigger signal is inputted to an OR circuit 1917, n sample hold (S/H) circuits 1924-1 to 1924-*n*, and n counters 1925-1 to 1925-*n*.

Next, the operation of the total jitter measurement block 191 will be explained. The absolute value of the zero cross sample value outputted from the ABS circuit 1912 is added on an adder 1913. The addition result is sample-held in timing in which any trigger signal is at high level (or low level) (i.e. in timing in which any data pattern is inputted to the total jitter measurement block 191), on a sample-holding circuit 1914. The result is outputted to a divider 1916 and is fed back to the adder 1913. Thus, a sum of the absolute values of the zero cross sample values of all the data patterns is outputted to the divider 1916. On the other hand, a counter 1915 counts the number of times that the trigger signal is at high level (or low level) (i.e. the number of the data patterns inputted to the total jitter measurement block 191). The count result is outputted to the divider 1916. The divider 1916 divides the sum of the absolute values of the zero cross sample values by the number of the data patterns inputted. As a result, an average value of the absolute values of the zero cross sample values is outputted. In the example, the average value of the absolute values of the zero cross sample values is a total jitter (i.e. jitter as a whole, which is obtained in consideration of a random jitter component and a shift jitter component).

Next, the operation of the individual shift jitter component measurement blocks 192-1 to 192-*n* will be explained. Here, an explanation will be given on the operation of the individual shift jitter component measurement block 192-1 which corresponds to the zero cross sample value of the data pattern of a 3T mark in the rear of a space with a run length of 3T when the optical disc 100 is a DVD. By the actions of the adder 1923-1 and the sample-holding circuit 1924-1, in timing in which the trigger signal corresponding to the data pattern of the 3T mark in the rear of the space with a run length of 3T is at high level (or low level) (i.e. in timing in which a boundary zero cross sample of the 3T mark in the rear of the 3T space is inputted to the individual shift jitter component measurement block 192-1), the boundary zero cross sample of the 3T mark in the rear of the 3T space is sample-held. The result is outputted to a divider 1926-1 and is fed back to the adder 1923-1. In other words, on the adder 1923-1, only the boundary zero cross sample value of the 3T mark in the rear of the 3T space is integrated, and a sum of the boundary zero cross sample values of the 3T mark in the rear of the 3T space is outputted to the divider 1926-1. On the other hand, a counter 1925-1 counts the number of times N(1) that the trigger signal is at high level (or low level) (i.e. the number of the boundary zero cross samples of the 3T mark in the rear of the 3T space inputted to the individual shift jitter component measurement block 192-1). The count result is outputted to the divider 1926-1. The divider 1926-1 divides the sum of the boundary zero cross sample values of the 3T mark in the rear of the 3T space by the inputted N(1). As a result, an average value S(1) of the boundary zero cross sample values of the 3T mark in the rear of the 3T space is outputted. This operation is performed for each corresponding data pattern, on the other individual shift jitter component measurement blocks 192-2 to 192-*n*. In the example, the average values of the zero cross sample values in the respective data patterns are individual shift jitter components S(1) to S(n).

The individual shift jitter components S(1) to S(n) in the respective data patterns are also outputted to the whole shift jitter component measurement circuit 193. Moreover, the number of times N(1) to N(n) that the trigger signal is at high level are also outputted to the whole shift jitter component measurement circuit 193. On the whole shift jitter component measurement circuit 193, a shift jitter component as a whole obtained in consideration of the occurrence probability of the individual shift jitter components in the respective data patterns is outputted by performing an arithmetic operation shown in an Equation 1.

$$\sqrt{\sum_{i=1}^{n} S(i)^2 \frac{N(i)}{\sum_{j=1}^{n} N(j)}}$$  [Equation 1]

In FIG. 4 again, then, under the control of the CPU 22, it is judged whether or not the individual shift jitter components of the jitter measured in the step S202 are less than a first threshold value (step S203). The judgment is performed in each data pattern. In other words, the judgment is performed on each of the individual shift jitter components measured on the individual shift jitter component measurement blocks 192-1 to 192-*n*. Specifically, if the optical disc 100 is a DVD and 6T or more are treated as the same group, the judgment in the data pattern of a front space with a run length of 3T, the judgment in the data pattern of a front space with a run length of 4T, the judgment in the data pattern of a front space with a run length of 5T, and the judgment in the data pattern of a front space of a run length of 6T are performed with respect to the 3T mark. In the same manner, the judgments in the data patterns of the front spaces with run lengths of 3T, 4T, 5T, and 6T or more are performed with respect to marks with 4T or more. The judgments in the data patterns of rear spaces with run lengths of 3T, 4T, 5T, and 6T or more are performed with respect to marks with 3T, 4T, 5T, and 6T or more. Although 6T or more are treated as the unified group, if the recording compensation is performed with respect to an influence of coma aberration or the like by a tangential tilt, it is possible to treat the influenced data pattern, or individually treat 3T to 11T and 14T. On the other hand, if the optical disc 100 is a Blu-ray Disc and 5T or more are treated as the same group, the judgment in the data patterns of front spaces or rear spaces with 2T, 3T, 4T, and 5T or more is performed with respect to marks with 2T, 3T, 4T, and 5T or more. Although 5T or more are treated as the unified group, as in the DVD, if the recording compensation is performed with respect to the influence of coma aberration or the like by the tangential tilt, it is possible to treat the influenced data pattern, or individually treat 2T to 9T.

Incidentally, a value common to all the data patterns may be used as the first threshold value or an individual value for each data pattern (or each group including a plurality of data patterns) may be used as the first threshold value. Moreover, the specific value of the first threshold value is preferably set to realize that a ratio of the random jitter component to the jitter is greater than or equal to a predetermined value (e.g. approximately 80% as described later). Incidentally, the recording compensation operation may be performed such that the ratio of the random jitter component to the total jitter is greater than or equal to approximately 80%. However, in order to further reduce the total jitter, the recording compensation operation may be performed such that the ratio of the random jitter component to the total jitter is greater than or equal to approximately 90%.

As a result of the judgment in the step S203, if it is judged that the shift jitter components in at least one or all of the data patterns are less than the first threshold value (the step S203: Yes), the recording compensation operation is ended, under the control of the CPU 22.

On the other hand, as a result of the judgment in the step S203, if it is judged that the shift jitter components in at least one or all of the data patterns are not less than the first threshold value (the step S203: No), the operation of adjusting the strategy, which is the recording compensation operation, is performed (step S204).

Here, the recording compensation may be performed on the data pattern corresponding to the shift jitter component that is judged not to be less than the first threshold value. Alternatively, in addition to the data pattern corresponding to the shift jitter component that is judged not to be less than the first threshold value, the recording compensation may be performed on the data pattern corresponding to the shift jitter component that is judged to be less than the first threshold value.

Here, with reference to FIG. 7, the recording compensation operation in the step S204 in FIG. 4 will be explained. FIG. 7 is a graph conceptually showing the states of the shift jitter components in the respective data patterns and the shift jitter component as a whole before recording compensation and the states of the shift jitter components in the respective data patterns and the shift jitter component as a whole after the recording compensation. The average value of a distribution in each data pattern is the individual shift jitter component.

As shown in FIG. 7, in the first example, such a recording compensation operation is performed that the variations of each of the individual shift jitter components in the respective data patterns is reduced or eliminated. More specifically, if the jitter distributions in the respective data patterns have variations on the basis of the rising point of the clock shown by a longitudinal arrow as shown on the left side of FIG. 7, the recording compensation operation is performed such that the jitter distributions in the respective data patterns are shifted to the rising point of the clock as shown on the right side of FIG. 7. In other words, the recording compensation operation is performed such that the jitter distributions in the respective data patterns match at or in the vicinity or the rising point of the clock. In other words, the recording compensation operation is performed such that the jitter distributions in the respective data patterns are equal. As a result, the jitter distribution as a whole (i.e. total jitter distribution) is a normal distribution centered on the rising position of the clock or the like. Namely, in the recording compensation operation in the example, instead of reducing the widths of the jitter distributions in the respective data patterns (in other words, instead of reducing the random jitter component), the average values of the jitter distributions in the respective data patterns are matched. This corresponds to an operation of reducing the individual shift jitter components in the respective data patterns.

In order to reduce the individual shift jitter components in the respective data patterns, the recording strategy adjustment circuit 21 adjusts the recording strategy, for example, as shown in FIG. 8 to FIG. 10. FIG. 8 is a timing chart conceptually showing a first aspect of the recording strategy adjustment operation. FIG. 9 is a timing chart conceptually showing a second aspect of the recording strategy adjustment operation. FIG. 10 is a timing chart conceptually showing a third aspect of the recording strategy adjustment operation.

For example, as shown in FIG. 8, the pulse width of a recording pulse (i.e. recording strategy) which defines the waveform of the laser beam for recording the data pattern (record data) may be adjusted.

Moreover, as shown in FIG. 9, the amplitudes (e.g. a top pulse amplitude Po, a middle pulse amplitude Pm, a bottom pulse amplitude Pb) of the recording pulse (i.e. recording strategy) which define the waveform of the laser beam for recording the data pattern (record data) may be adjusted. Here, as shown in the recording pulse on the top in FIG. 9, the amplitudes of the recording pulse corresponding to the data patterns with run lengths of 3T and 4T and the amplitudes of the recording pulse corresponding to the data patterns with run lengths of 5T or more may be separately adjusted. Alternatively, as shown in the second recording pulse from the top in FIG. 9, the amplitudes of the recording pulse corresponding to the data pattern with a run length of 3T, the amplitudes of the recording pulse corresponding to the data pattern with a run length of 4T, the amplitudes of the recording pulse corresponding to the data pattern with a run length of 5T, and the amplitudes of the recording pulse corresponding to the data pattern with run lengths of 6T or more may be separately adjusted. Alternatively, as shown in the third recording pulse from the top in FIG. 9, the amplitudes of the recording pulse corresponding to the data pattern with a run length of 3T, the amplitudes of the recording pulse corresponding to the data pattern with a run length of 4T, and the amplitudes of the recording pulse corresponding to the data pattern with run lengths of 5T or more may be separately adjusted. Alternatively, as shown in the fourth recording pulse from the top in FIG. 9, the amplitudes of the recording pulse corresponding to the data pattern with a run length of 3T and the amplitudes of the recording pulse corresponding to the data pattern with run lengths of 4T or more may be separately adjusted.

Moreover, as shown in FIG. 10, even if the recording pulse is not of a castle type, as in the case shown in FIG. 9, the amplitudes of the recording pulse (i.e. the recording strategy) which define the waveform of the laser beam for recording the data pattern (or record data) may be adjusted.

Of course, it is obvious that the recording strategy may be adjusted by combining the adjustment of the pulse width of the recording pulse as shown in FIG. 8 and the adjustment of the amplitudes of the recording pulse as shown in FIG. 9 and FIG. 10, as occasion demands.

In FIG. 3 again, as a result of the operation in the step S102, an optimum strategy for recording the data pattern at the recording speed of Mx (hereinafter referred to as a "Mx optimum strategy", as occasion demands) is generated by adjusting the initial strategy which constitutes one specific example of the "first standard strategy" of the present invention (hereinafter referred to as a "Mx standard strategy", as occasion demands).

Incidentally, the example adopts such construction that a difference between the Mx optimum strategy and the Mx standard strategy is not calculated, which is described later, by treating the Mx optimum strategy as the Mx standard strategy. In this sense, the Mx optimum strategy corresponds to one specific example of the "first optimum strategy" and the "first standard strategy" of the present invention.

Then, under the control of the CPU 22, a clock cycle conversion process according to a difference between the recording speed of Mx and a recording speed of Nx (wherein N≧1 and N≠M) is performed on the Mx optimum strategy generated in the step S102. As a result, a standard strategy for recording the data pattern at the recording speed of Nx (hereinafter referred to as a "Nx standard strategy, as occasion demands) is generated (step S103). In the same manner, under the control of the CPU 22, a clock cycle conversion process according to a difference between the recording speed of Mx and a recording speed of Cx (wherein C≧1, C>N, and C>M) is performed on the Mx optimum strategy generated in the step S102. As a result, a standard strategy for recording the data pattern at the recording speed of Cx (hereinafter referred to as a "Cx standard strategy, as occasion demands) is generated (the step S103). Incidentally, the Nx standard strategy corresponds to one specific example of the "second standard strategy" of the present invention. The Cx standard strategy corresponds to one specific example of the "third standard strategy" of the present invention.

Incidentally, the recording speed of Nx is a realizable recording speed when the data pattern is recorded into the inner PCA 111. For example, if the optical disc 100 is a DVD, a recording speed of 6× is listed as one example as the recording speed of Nx. On the other hand, the recording speed of Cx is an unrealizable recording speed when the data pattern is recorded into the inner PCA 111. For example, if the optical disc 100 is a DVD, a recording speed of 8× is listed as one example as the recording speed of Cx.

Now, with reference to FIG. 11, the clock cycle conversion process will be explained. FIG. 11 is a timing chart conceptually showing an aspect of the clock cycle conversion process in association with the data pattern, clock, and strategy. Incidentally, FIG. 11 explains an example of generating the Nx standard strategy by performing the clock cycle conversion process on the Mx optimum strategy.

As shown in FIG. 11, the clock cycle conversion process corresponds to a process of converting the pulse width of the Mx optimum strategy and obtaining the Nx standard strategy in accordance with a difference between the clock in the recording speed of Mx and the clock in the recording speed of Nx (e.g. a rate of change in the pulse width of the clock or the like). Specifically, as shown in the upper part of FIG. 11, the pulse width of the clock in the recording speed of Mx (i.e. 1T corresponding to 1 clock) is greater than the pulse width of the clock in the recording speed of Nx. By reducing the pulse width of the Mx optimum strategy in accordance with the difference, the Nx standard strategy is generated. More specifically, the shape of the Nx standard strategy, generated by the clock cycle conversion process, with respect to the clock at the recording speed of Nx is substantially similar to the shape of the Mx optimum strategy with respect to the clock at the recording speed of Mx. In other words, if a rate of change between the pulse width of the clock at the recording speed of Mx and the pulse width of the clock at the recording speed of Nx is B % (wherein B is a real number), the pulse width of the Mx optimum strategy is changed by B % by the clock cycle conversion process, and as a result, the Nx standard strategy is generated.

Incidentally, FIG. 11 explains the example of generating the Nx standard strategy by performing the clock cycle conversion process on the Mx optimum strategy. However, obviously, general processes of converting the pulse width of a strategy at one recording speed and obtaining a strategy at another recording speed in accordance with a difference in the clock (e.g. a rate of change in the pulse width of the clock) between the two different types of recording speeds (the one recording speed and the other recording speed) are included in the "clock cycle conversion process" in the example.

In FIG. 3 again, then, under the control of the CPU 22, the OPC process is performed at the recording speed of Nx (step S104). In other words, the OPC pattern is recorded into the inner PCA 111 at the recording speed of Nx, thereby calculating the optimum power of the laser beam LB for recording the data pattern at the recording speed of Nx (hereinafter referred to as a "Nx optimum power" as occasion demands). Incidentally, the Nx optimum power corresponds to one specific example of the "second optimum power" of the present invention.

Here, in particular, the Nx optimum power is calculated such that the asymmetry or β value of the data pattern recorded at the recording speed of Mx and in the Mx optimum strategy is equal to the asymmetry or β value of the data pattern recorded at the recording speed of Nx and in the Nx standard strategy.

Then, under the control of the CPU 22, the recording compensation operation is performed at the recording speed of Nx (step S105). The recording compensation operation is basically the same as the recording compensation operation in the step S102. Here, the data pattern for the recording compensation is recorded by applying the laser beam LB with the Nx optimum power and in the Nx standard strategy into the inner PCA 111 at the recording speed of Nx. As a result, the Nx standard strategy is adjusted, thereby generating the optimum strategy for recording the data pattern the recording speed of Nx (hereinafter referred to as a "Nx optimum strategy" as occasion demands). Incidentally, the Nx optimum strategy corresponds to one specific example of the "second optimum strategy" of the present invention.

Then, under the control of the CPU 22, a difference between the Nx standard strategy generated in the step S103 and the Nx optimum strategy generated in the step S105 is calculated (step S106). Now, with reference to FIG. 12 and FIG. 13, a more detailed explanation will be given on the operation of calculating the difference between the Nx standard strategy and the Nx optimum strategy. FIG. 12 is an explanatory diagram showing the difference between the Nx standard strategy and the Nx optimum strategy, calculated for each of types of data patterns. FIG. 13 is an explanatory diagram showing a difference between the Mx standard strategy and the Mx optimum strategy, and the difference between the Nx standard strategy and the Nx optimum strategy, calculated for each of the types of data patterns.

As shown in FIG. 12, the data pattern can be shown by a combination of a mark and two spaces located before and after the mark (i.e. the front space and the rear space). At this time, each of the shift amount of a front edge and the shift amount of a rear edge of the mark is calculated as the difference between the Nx standard strategy and the Nx optimum strategy. In other words, each of (i) the shift amount of the front edge of a mark recorded in the Nx standard strategy with respect to the front edge of a mark recorded in the Nx optimum strategy and (ii) the shift amount of the rear edge of the mark recorded in the Nx standard strategy with respect to the rear edge of the mark recorded in the Nx optimum strategy is calculated as the difference between the Nx standard strategy and the Nx optimum strategy. Alternatively, in a data pattern classification method in FIG. 12, how much the Nx standard strategy in FIG. 11 is displaced by the recording compensation may be calculated as the difference.

The calculation operation is performed by the number of the combinations of the run lengths in accordance with the run lengths of the mark and the two spaces located before and after the mark.

Specifically, the shift amount of the front edge of a mark with a run length of 3T is calculated in each case where the run length of the front space is 3T, 4T, 5T, or 6T or more. In other words, the shift amount of the front edge of the mark with 3T recorded in the Nx optimum strategy with respect to the front edge of the 3T mark recorded in the Nx standard strategy is calculated in each case where the run length of the front space is 3T, 4T, 5T, or 6T or more. In the same manner, the shift amount of the front edge of a mark with a run length of 4T is calculated in each case where the run length of the front space is 3T, 4T, 5T, or GT or more. In the same manner, the shift amount of the front edge of a mark with a run length of 5T is calculated in each case where the run length of the front space is 3T, 4T, 5T, or 6T or more. In the same manner, the shift amount of the front edge of a mark with a run length of 6T or more is calculated in each case where the run length of the front space is 3T, 4T, 5T, or 6T or more.

As a result, as shown on the lower left side of FIG. 13, the shift amount of the front edge of the 3T mark recorded in the Nx optimum strategy with respect to the front edge of the 3T mark recorded in the Nx standard strategy in each case where the run length of the front space is 3T, 4T, 5T, or 6T or more is calculated as n(1), n(5), n(9), or n(13), respectively. In the same manner, the shift amount of the front edge of the 4T mark recorded in the Nx optimum strategy with respect to the front edge of the 4T mark recorded in the Nx standard strategy in each case where the run length of the front space is 3T, 4T, 5T, or 6T or more is calculated as n(2), n(6), n(10), or n(14), respectively. In the same manner, the shift amount of the front edge of the 5T mark recorded in the Nx optimum strategy with respect to the front edge of the 5T mark recorded in the Nx standard strategy in each case where the run length of the front space is 3T, 4T, 5T, or 6T or more is calculated as n(3), n(7), n(11), or n(15), respectively. In the same manner, the shift amount of the front edge of the 6T or more mark recorded in the Nx optimum strategy with respect to the front edge of the 6T or more mark recorded in the Nx standard strategy in each case where the run length of the front space is 3T, 4T, 5T, or 6T or more is calculated as n(4), n(8), n(12), or n(16), respectively.

In the same manner, the shift amount of the rear edge of the mark with a run length of 3T is calculated in each case where the run length of the rear space is 3T, 4T, 5T, or 6T or more. In other words, the shift amount of the rear edge of the mark with 3T recorded in the Nx optimum strategy with respect to the rear edge of the 3T mark recorded in the Nx standard strategy is calculated in each case where the run length of the rear space is 3T, 4T, 5T, or 6T or more. In the same manner, the shift amount of the rear edge of the mark with a run length of 4T is calculated in each case where the run length of the rear space is 3T, 4T, 5T, or 6T or more. In the same manner, the shift amount of the rear edge of the mark with a run length of 5T is calculated in each case where the run length of the rear space is 3T, 4T, 5T, or 6T or more. In the same manner, the shift amount of the rear edge of the mark with a run length of 6T or more is calculated in each case where the run length of the rear space is 3T, 4T, 5T, or 6T or more.

As a result, as shown on the lower right side of FIG. 13, the shift amount of the rear edge of the 3T mark recorded in the Nx optimum strategy with respect to the 3T mark recorded in the Nx standard strategy in each case where the run length of the rear space is 3T, 4T, 5T, or 6T or more is calculated as n'(1), n'(5), n'(9), or n'(13). In the same manner, the shift amount of the rear edge of the 4T mark recorded in the Nx optimum strategy with respect to the 4T mark recorded in the Nx standard strategy in each case where the run length of the rear space is 3T, 4T, 5T, or 6T or more is calculated as n'(2), n'(6), n'(10), or n'(14). In the same manner, the shift amount of the rear edge of the 5T mark recorded in the Nx optimum strategy with respect to the 5T mark recorded in the Nx standard strategy in each case where the run length of the rear space is 3T, 4T, 5T, or 6T or more is calculated as n'(3), n'(7), n'(11) or n'(15). In the same manner, the shift amount of the rear edge of the 6T or more mark recorded in the Nx optimum strategy with respect to the 6T or more mark recorded in the Nx standard strategy in each case where the run length of the rear space is 3T, 4T, 5T, or 6T or more is calculated as n'(4), n'(8), n'(12), or n'(16).

Incidentally, in the first example, the Nx standard strategy is generated by performing the clock cycle conversion process on the Mx optimum strategy. However, the Nx standard strategy may be generated by preparing the Mx standard strategy separately from the Mx optimum strategy and by performing the clock cycle conversion process on the Mx standard strategy. In this case, in the step S106 in FIG. 3, in addition to the difference between the Nx standard strategy and the Nx optimum strategy, the difference between the Mx standard strategy and the Mx optimum strategy is preferably calculated as shown in the upper left and the upper right of FIG. 13. Incidentally, if the Nx standard strategy is generated by performing the clock cycle conversion process on the Mx optimum strategy, all the values shown in the upper left and the upper right of FIG. 13 (i.e. m(k) and m'(k), $1 \leq k \leq 16$) are zero.

In FIG. 3 again, then, the optimum power of the laser beam LB for recording the data pattern at the recording speed of Cx (hereinafter referred to as a "Cx optimum power", as occasion demands) is calculated on the basis of the Mx optimum power and the Nx optimum power by the operation of the CPU 22 (step S108).

Now, with reference to FIG. 14, an explanation will be given on the operation of calculating the Cx optimum power on the basis of the Mx optimum power and the Nx optimum power. FIG. 14 is a graph conceptually showing the operation of calculating the Cx optimum power on the basis of the Mx optimum power and the Nx optimum power.

As shown in FIG. 14, the Cx optimum power is calculated by linearly interpolating the Mx optimum power and the Nx optimum power. Here the linear interpolation is performed, but obviously, another interpolation process may be performed to calculate the Cx optimum power.

In FIG. 3 again, then, the optimum strategy for recording the data pattern at the recording speed of Cx (hereinafter referred to as a "Cx optimum strategy", as occasion demands) is generated by the operation of the CPU 22 (step S108). The Cx optimum strategy is generated by adjusting the Cx standard strategy on the basis of the difference explained with reference to FIG. 12 and FIG. 13.

Specifically, the front edge of the pulse of the Cx standard strategy is adjusted on the basis of the shift amount of the front edge of the mark recorded in the Nx standard strategy with respect to the front edge of the mark recorded in the Nx optimum strategy, and the rear edge of the pulse of the Cx standard strategy is adjusted on the basis of the shift amount of the rear edge of the mark recorded in the Nx standard strategy with respect to the rear edge of the mark recorded in the Nx optimum strategy.

The pulse of the Cx standard strategy is also adjusted by the number of combinations of the run lengths in accordance with the run lengths of the mark and the two spaces located before and after the mark. In other words, on the basis of the shift amount of the front edge of a kT mark (wherein $3 \leq k \leq 14$) recorded in the Nx optimum strategy with respect to the front edge of the kT mark recorded in the Nx standard strategy in a case where the front space has a run length of jT (wherein $3 \leq j \leq 14$), the front edge of the pulse of the Cx standard strategy for recording the kT mark in the case where the front space has a run length of jT is adjusted. In the same manner, on the basis of the shift amount of the rear edge of the kT mark recorded in the Nx optimum strategy with respect to the rear edge of the kT mark recorded in the Nx standard strategy in a case where the rear space has a run length of jT, the rear edge of the pulse of the Cx standard strategy for recording the kT mark in the case where the rear space has a run length of jT is adjusted. The same holds true for the mark pattern with another run length.

More specifically, an adjustment amount $C(x)$ of the front edge of the pulse of the Cx standard strategy is expressed by $(n(x)-m(x)) \times C/(N-M) + (N \times m(x) - M \times n(x))/(N-M)$. In the same manner, an adjustment amount $C'(x)$ of the rear edge of the pulse of the Cx standard strategy is expressed by $(n'(x)-m'(x)) \times C/(N-M) + (N \times m'(x) - M \times n'(x))/(N-M)$. In this case, x is a variable uniquely specified if the data pattern is classified as the run lengths of the mark and the two spaces located before and after the mark shown in FIG. 13, and it can be seen from FIG. 13 that $1 \leq x \leq 16$.

As a result, the Cx optimum strategy is generated by shifting the front edge of the pulse of the Cx standard strategy by $C(x)$ and by shifting the rear edge of the pulse of the Cx standard strategy by $C'(x)$, in each of the combination patterns of the run lengths of the mark and the two spaces located before and after the mark.

Then, under the control of the CPU 22, the recording is started (step S109). For example, when the data pattern is recorded with Mx, the optical disc 100 is irradiated with the laser beam LB with the Mx optimum power and in the Mx optimum strategy. In the same manner, when the data pattern is recorded with Nx, the optical disc 100 is irradiated with the laser beam LB with the Nx optimum power and in the Nx optimum strategy. In the same manner, when the data pattern is recorded with Cx, the optical disc 100 is irradiated with the laser beam LB with the Cx optimum power and in the Cx optimum strategy.

As explained above, according to the recording apparatus 1 in the first example, it is possible to generate the Cx optimum strategy without performing the recording compensation operation at the higher recording speed of Cx, from the Mx optimum strategy and the Nx optimum strategy calculated by performing the recording compensation operation at each of the recording speeds of Mx and Nx. Thus, it is effective particularly in generating the optimum strategy for recording the data pattern at an unrealizable recording speed in the inner PCA 111 of the optical disc 100.

Moreover, particularly in the first example, in order to calculate the Nx optimum strategy, the recording compensation operation is performed by using the laser beam LB with the Nx optimum power which allows the asymmetry or β value to be optimum (e.g. to be equal to the asymmetry or β value obtained when the data pattern is recorded with the Mx optimum power and in the Mx optimum strategy). Thus, for the strategy of the Nx standard strategy for recording a short mark (e.g. 3T mark 4T mark or the like), the adjustment amount which allows jitter to satisfy a desired condition is reduced or becomes zero. Thus, it is only necessary to adjust the strategy for recording at least one portion (e.g. a long mark with 5T or more) of the data pattern, and it is unnecessary to adjust the strategy of the Nx standard strategy for recording another portion (e.g. the short mark with 3T and 4T) of the data pattern.

This will be explained in more detail with reference to FIG. 15 and FIG. 16. FIG. 15 shows the shift amount of the strategy when the data pattern is recorded by using the Cx standard strategy and the Nx standard strategy calculated from the Mx standard strategy by the clock cycle conversion process if the Mx optimum strategy is used as the Mx standard strategy, and FIG. 15 is graphs showing, for each of run length patterns of a front space and for each recording speed, (i) a shift amount between the front edge of a 3T mark recorded in each of the Mx standard strategy, the Nx standard strategy, and the Cx standard strategy and the front edge of a 3T mark recorded in the Mx standard strategy, (ii) a shift amount between the front edge of a 4T mark recorded in each of the Mx standard strategy, the Nx standard strategy, and the Cx standard strategy and the front edge of a 4T mark recorded in the Mx standard strategy, (iii) a shift amount between the rear edge of the 3T mark recorded in each of the Mx standard strategy, the Nx standard strategy, and the Cx standard strategy and the rear edge of the 3T mark recorded in the Mx standard strategy, and (iv) a shift amount between the rear edge of the 4T mark recorded in each of the Mx standard strategy, the Nx standard strategy, and the Cx standard strategy and the rear edge of the 4T mark recorded in the Mx standard strategy. FIG. 16 is graphs showing, for each of run length patterns of a rear space and for each recording speed, (i) a shift amount between the front edge of a 5T mark recorded in each of the Mx standard strategy, the Nx standard strategy, and the Cx standard strategy and the front edge of a 5T mark recorded in the Mx standard strategy (ii) a shift amount between the front edge of a 6T or more mark recorded in each of the Mx standard strategy, the Nx standard strategy, and the Cx standard strategy and the front edge of a 6T or more mark recorded in the Mx standard strategy (iii) a shift amount between the rear edge of the 5T mark recorded in each of the Mx standard strategy, the Nx standard strategy, and the Cx standard strategy and the rear edge of the 5T mark recorded in the Mx standard strategy, and (iv) a shift amount between the rear edge of the 6T or more mark recorded in each of the Mx standard strategy, the Nx standard strategy, and the Cx standard strategy and the rear edge of the 6T or more mark recorded in the Mx standard strategy, As shown on the left side of FIG. 15, the shift amount of the front edges of the 3T mark and the 4T mark recorded in each standard strategy with respect to the front edges of the 3T mark and the 4T mark recorded in the Mx standard strategy (i.e. Mx optimum strategy) is approximately 0 at any recording speeds (i.e. Mx, Nx, and Cx). In the same manner, as shown on the right side of FIG. 15, the shift amount of the rear edges of the 3T mark and the 4T mark recorded in each standard strategy with respect to the rear edges of the 3T mark and the 4T mark recorded in the Mx standard strategy (i.e. Mx optimum strategy) is approximately 0 at any recording speeds (i.e. Mx, Nx, and Cx).

On the other hand, as shown on the left side of FIG. 16, the shift amount of the front edge of the 5T or more mark recorded in each standard strategy with respect to the front edge of the 5T or more mark recorded in the Mx standard strategy increases as the recording speed increases. In the same manner, as shown on the right side of FIG. 16, the shift amount of the rear edge of the 5T or more mark recorded in each standard strategy with respect to the rear edge of the 5T or more mark recorded in the Mx standard strategy increases as the recording speed increases.

Thus, even if the strategy of the Nx standard strategy for recording one portion of the data pattern (e.g. 3T and 4T short marks) is not adjusted, the Nx optimum strategy can be preferably generated by adjusting the strategy for recording another portion of the data pattern (e.g. 5T or more long mark). Thus, it is possible to relatively reduce the load of the recording compensation operation. In other words, unlike the technology presented in the background art, it is unnecessary to perform the complicated and high-load waveform conversion which provides the constant energy, so that the load of the recording apparatus 1 can be relatively reduced.

As a result, according to the recording apparatus 1 in the first example, the data pattern is recorded by using the optimum strategy at each of any recording speeds. Thus, the total jitter can be reduced. Now, with reference to FIG. 17, a total jitter reduction effect in the first example will be explained. FIG. 17 is a graph conceptually showing the total jitter reduction effect in the first example. Incidentally, the Mx optimum strategy is used as the Mx standard strategy at the recording speed of Mx, so that both jitter expressed by "with the recording compensation" and jitter expressed by "without the recording compensation" are the jitters of the data pattern recorded by the Mx optimum strategy. Moreover, at the recording speed of Nx, the jitter expressed by "with the recording compensation" is the jitter of the data pattern recorded by the Nx optimum strategy, and the jitter expressed by "without the recording compensation" is the jitter of the data pattern recorded by the Nx standard strategy. Moreover, at the recording speed of Cx, the jitter expressed by "with the recording compensation" is the jitter of the data pattern recorded by the Cx optimum strategy, and the jitter expressed by "without the recording compensation" is the jitter of the data pattern recorded by the Cx standard strategy.

As shown in FIG. 17, in comparison with the jitter of the data pattern recorded in the Nx standard strategy, the jitter of the data pattern recorded in the Nx optimum strategy has a generally good value (specifically, about 6%). In the same manner, in comparison with the jitter of the data pattern recorded in the Cx standard strategy, the jitter of the data pattern recorded in the Cx optimum strategy has a generally good value (specifically about 6%). In other words, the Cx optimum strategy generated in the first example is considered to be substantially the same strategy as the strategy adjusted by actually recording the data pattern for the recording compensation at the recording speed of Cx. Thus, according to the first example, even if the data pattern for the recording compensation is not actually recorded at the recording speed, it is possible to preferably generate the Cx optimum strategy which is the same as the strategy adjusted by actually recording the data pattern for the recording compensation at the recording speed of Cx.

(1-4) Second Operation Example

Next, with reference to FIG. 18, a second operation example of the recording apparatus 1 in the first example will be explained. FIG. 18 is a graph conceptually showing the optimum power in the second operation example.

In the aforementioned first operation example, the power obtained by recording the OPC pattern at the recording speed of Nx (i.e. the power in which the same asymmetry or β value as the asymmetry or β value of the data pattern recorded at the recording speed of Mx is obtained by the OPC performed at the recording speed of Nx) is used as the second optimum power. In the second operation example, the power which is further reduced from the power obtained by recording the OPC pattern at the recording speed of Nx is used as the second optimum power. Thus, the third optimum power obtained by linearly interpolating the first optimum power and the second optimum power is also smaller than the third optimum power in the first operation example.

As described above, according to the second operation example, it is possible to relatively reduce the optimum power in the recording at the relatively high recording speed of Cx. This allows the longevity of the pickup 11 for applying the laser beam LB (more specifically, a laser diode or the like provided in the pickup 11). Alternatively, if the optical disc 10 is of a rewritable type, this can prevent the deterioration of the recording surface.

However, since the power that is smaller than the power in which the asymmetry has an optimum value (i.e. the power obtained by the OPC) is used as the second optimum power, the adjustment amount which allows the jitter to satisfy the desired condition is highly likely large, even in the strategy of the Nx standard strategy for recording the short mark (e.g. 3T mark and 4T mark or the like). Thus, in the second operation example, in order to generate the Nx optimum strategy, it is preferable to adjust not only the strategy of the Nx standard strategy for recording at least one portion of the data pattern (e.g. 5T or more long mark) but also the strategy of the Nx standard strategy for recording another portion of the data pattern (e.g. 3T and 4T short marks).

(1-5) Third Operation Example

Next, with reference to FIG. 19 and FIG. 20, a third operation example of the recording apparatus 1 in the first example will be explained. FIG. 19 is a timing chart conceptually showing an aspect of the clock cycle conversion process in the third operation example in association with the data pattern, clock, and strategy. FIG. 20 is a graph conceptually showing an optimum power in the third operation example.

In the aforementioned first operation example, the clock cycle conversion process is performed such that the shape of the Nx standard strategy with respect to the clock at the recording speed of Nx is substantially similar to the shape of the Mx optimum strategy with respect to the clock at the recording speed of Mx. In other words, if the rate of change between the pulse width of the clock at the recording speed of Mx and the pulse width of the clock at the recording speed of Nx is B % (wherein B is a real number), the pulse width of the Mx optimum strategy is changed by B % by the clock cycle conversion process, and as a result, the Nx standard strategy is generated. In this third operation example, after the generation of such a strategy at the recording speed of Nx that has a substantially similar relation with the shape of the Mx optimum strategy with respect to the clock at the recording speed of Mx, and then the Nx standard strategy is generated by magnifying or reducing the pulse width of the strategy at a constant rate or by shifting it by a constant amount. In other words, if the rate of change between the pulse width of the clock at the recording speed of Mx and the pulse width of the clock at the recording speed of Nx is C % (wherein C is a real number), the pulse width of the Mx optimum strategy is changed by the clock cycle conversion process by (C+α)% (wherein α is a real number), and as a result, the Nx standard strategy is generated.

At this time, the rate of change in the pulse width may be changed in each data pattern. For example, as shown in FIG. 19, a change rate b of the pulse width of the strategy for recording the long mark and a change rate a of the pulse width of the strategy for recording the short mark may also have different values.

Here, by performing the clock cycle conversion process so as to increase the pulse width (i.e. by setting the aforementioned variable α to a positive value or by setting the change rates a and b to a value of 1 or more), it is possible to make the second optimum power obtained by recording the OPC pattern at the recording speed of Nx (i.e. by performing the OPC at the recording speed of Nx), be smaller than the second optimum power in the first operation example, as shown in FIG. 20. Thus, the third optimum power obtained by linearly interpolating the first optimum power and the second optimum power also becomes smaller than the third optimum power in the first operation example. Therefore, it is possible to preferably receive the various effects explained in the second operation example.

(1-6) Fourth Operation Example

Next, with reference to FIG. 21, a fourth operation example of the recording apparatus 1 in the first example will be explained. FIG. 21 is a flowchart conceptually showing a flow of operations in the fourth operation example of the recording apparatus 1 in the first example. Incidentally, the same operation as that in the aforementioned first operation example will carry the same step number, and the detailed explanation thereof will be omitted.

As shown in FIG. 21, in the fourth operation example, a partial operation of the recording compensation operation shown in FIG. 4 is changed. Specifically, even in the fourth operation example, the recording of the data pattern in the step S201 explained in the first operation example is performed.

Then, by the operation of the averaging circuit 19, the total jitter is measured (step S301). Then, by the operation of the CPU 22, it is judged whether or not the total jitter is less than or equal to a second threshold value (step S302). The second threshold value used here may be, for example, a value determined in the standard of the optical disc 100 or a jitter value that does not influence the recording operation or reproduction operation. Alternatively, the second threshold value may be, for example, 12%, 10%, 8%, or less.

As a result of the judgment in the step S302, if it is judged that the total jitter is less than or equal to the second threshold value (the step S302: Yes), the recording compensation operation is not performed but ended On the other hand, as a result of the judgment in the step S302, if it is judged that the total jitter is not less than or equal to the second threshold value (the step S302: No), the operations in the step S202 to the step S204 explained in the first operation example are performed.

As described above, according to the fourth operation example, it is possible to preferably receive the same effects as those that can be received in the first operation example. In addition, if the total jitter is less than or equal to the second threshold value (i.e. if the total jitter is good), the recording compensation operation is not necessarily performed. Thus, it is possible to reduce the operation load of the information recording apparatus 1.

(2) Second Example

Next, with reference to FIG. 22, a second example of the recording apparatus of the present invention will be explained. FIG. 22 is a block diagram conceptually showing the basic structure of a recording apparatus 2 in the second example. Incidentally, the same constituents as those of the aforementioned information recording apparatus 1 in the first example will carry the same referential numerals, and the explanation thereof will be omitted.

As shown in FIG. 22, the recording apparatus 2 in the second example is provided with a spindle motor 10, a pickup 11, a HPF 12, an A/D converter 13, a pre-equalizer 14, a binary circuit 16, a decoding circuit 17, a delay circuit 18, an averaging circuit 19, a pattern judgment circuit 20, a recording strategy adjustment circuit 21, and a CPU 22, as in the recording apparatus 1 in the first example.

The recording apparatus 2 in the second example is provided particularly with a limit equalizer 15 between the pre-equalizer 14 and each of the delay circuit 18 and the binary circuit 16. The limit equalizer 15 constitutes one specific example of the "amplitude limit filtering device" of the present invention. The limit equalizer 15 performs a high-frequency emphasis process on the read sample value series $RS_C$ without increasing the intersymbol interference, and it outputs a resulting high-frequency emphasized read sample value series $RS_H$ to each of the binary circuit 16 and the delay circuit 18. Incidentally, the operations of the limit equalizer 15 are the same as those of a conventional limit equalizer. Please refer to Japanese Patent publication No. 3459563 for the details.

As a result, the binary circuit 16, the decoding circuit 17, the delay circuit 18, the averaging circuit 19, the pattern judgment circuit 20, the recording strategy adjustment circuit 21, and the CPU 22 located after the limit equalizer 15 use the high-frequency emphasized read sample value series $RS_H$ to perform the operations, instead of the read sample value series $RS_C$.

As described above, according to the second example, the pattern judgment is performed as well as performing the recording compensation operation, by using the output of the limit equalizer 15 (i.e. the high-frequency emphasized read sample value series $RS_H$). In other words, the pattern judgment is performed as well as performing the recording compensation operation, with the amplitude level of the shortest data pattern emphasized. In any states of the asymmetry of the read signal it is possible to preferably prevent such a state that the shortest data pattern included in the read signal does not cross the zero level. As a result, the shortest data pattern can be preferably detected. This preferably allows the recording compensation operation to be performed with reference to the read signal including the shortest data pattern. In other words, regardless of the state of the asymmetry in the read signal before the recording compensation, the recording compensation operation can be preferably performed.

(3) Third Example

Next, with reference to FIG. 23 and FIG. 24, a third example of the recording apparatus of the present invention will be explained. FIG. 23 is a block diagram conceptually showing the basic structure of a recording apparatus 3 in the third example. FIG. 24 is a graph conceptually showing the optimum power in the third operation example. Incidentally, the same constituents as those of the aforementioned recording apparatus 1 in the first example and the recording apparatus 2 in the second example will carry the same referential numerals, and the explanation thereof will be omitted.

As shown in FIG. 23, the recording apparatus 3 in the third example is provided with a spindle motor 10, a pickup 11, a HPF 12, an A/D converter 13, a pre-equalizer 14, a limit equalizer 15, a binary circuit 16, a decoding circuit 17, a delay circuit 18, an averaging circuit 19, a pattern judgment circuit 20, a recording strategy adjustment circuit 21, and a CPU 22, as in the recording apparatus 2 in the second example.

The recording apparatus 3 in the third example is provided particularly with an adder 23 and a reference level detection circuit 24, each of which constitutes one specific example of the "adding device" of the present invention.

The reference level detection circuit 24 outputs a difference between the asymmetry which is actually detected and the asymmetry which is targeted, as offset OFS to the adder 23. On the adder 23, the OFS outputted from the reference level detection circuit 24 is added to the high-frequency emphasized read sample value series $RS_H$ outputted from the limit equalizer 15. This allows the reference level of the high-frequency emphasized read sample value series $RS_H$ to be set to a predetermined value.

Incidentally, a signal detected from the read signal on the reference level detection circuit 24 is not limited to the aforementioned asymmetry but may be a β value. Alternatively, it may be a partial β value indicating the deviation between the amplitude center of the read signal corresponding to the record data with the shortest run length and the amplitude center of the read signal corresponding to the record data with the second shortest run length. Alternatively, it may be an α value indicating a deviation ratio (or rate) of the amplitude center of the read signal corresponding to the record data with the shortest run length, with respect to the amplitude center (i.e. the reference level, and the zero level in the example) of the read signals corresponding to the respective record data with all types of run lengths (e.g. the record data with each of run lengths of 3T to 11T and 14T if the optical disc 100 is a DVD, and the record data with each of run lengths of 2T to 9T if the optical disc 100 is a Blu-ray Disc).

By adopting such a structure, the recording apparatus 3 in the third example can change the reference level, thereby arbitrarily setting the asymmetry of the read signal after the recording compensation. Therefore, it is possible to perform the recording compensation operation which realizes an optimum jitter value and the desired asymmetry. For example, if the optical disc 100 is a DVD, it is possible to perform the recording compensation operation which realizes the minimum jitter value and the asymmetry of +5%. In the same manner, if the optical disc 100 is a Blu-ray Disc, it is possible to perform the recording compensation operation which realizes the minimum jitter value and the asymmetry of +2.5%.

Moreover, since the asymmetry of the read signal after the recording compensation can be set to a desired value without depending on the asymmetry of the read signal before the recording compensation, it is possible to perform the good recording compensation operation even if the asymmetry varies depending on the individual difference of the optical disc 100 and the recording apparatus 3.

Moreover, since such construction that the offset corresponding to the difference between the detected asymmetry and the target asymmetry (i.e. such construction that the desired asymmetry is obtained after the recording compensation by adding the offset to the asymmetry before the recording compensation) is adopted, it is possible to set the asymmetry to the desired value even if the asymmetry before the recording compensation varies due to the recording compensation operation which is performed a plurality of times.

Moreover, since it is unnecessary to adjust the asymmetry by adjusting the recording power (i.e. the amplitude of the recording pulse), it is possible to simplify an operation of adjusting a recording condition, and it is also possible to reduce a time required for the operation of adjusting the recording condition.

In addition, as shown in FIG. 20, since the asymmetry can be arbitrarily adjusted, it is possible to make each of the first optimum power and the second optimum power obtained by the OPC, be smaller than each of the first optimum power and the second optimum power in the first operation example. Thus, the third optimum power obtained by linearly interpolating the first optimum power and the second optimum power becomes smaller than the third optimum power in the first operation example. Therefore, it is possible to preferably receive the various effects explained in the second operation example.

Incidentally, in the third example, the recording compensation operation is performed by using the high-frequency emphasized read sample value series $RS_H$ outputted from the limit equalizer 15. However, from the viewpoint that the asymmetry of the read signal after the recording compensation can be set to the desired value, the recording compensation operation is not necessarily performed by using the high-frequency emphasized read sample value series $RS_H$ outputted from the limit equalizer 15. In other words, even if the recording compensation operation is performed by using the read sample value series $RS_C$ outputted from the pre-equalizer 14, obviously, it is possible to receive the effect that the asymmetry of the read signal after the recording compensation can be set to the desired value. Therefore, in the third example, the limit equalizer 15 is not necessarily provided.

Incidentally, the result of the recording compensation operation may be recorded onto the optical disc 100 as strategy information. Alternatively, not only the result of the recording compensation operation but also the strategy information which directly or indirectly indicates each optimum strategy may be recorded onto the optical disc 100. In this case, it may be recorded onto the optical disc 100 when the recording operation is performed by a user, as occasion demands. Alternatively, it may be recorded on the optical disc 100 in advance by using embossed pits, prewriting, or the like, in the manufacturing of the optical disc 100. Here, it may be recorded in the RMA 112 shown in FIG. 2, a CDZ (Control Data Zone) in the lead-in area 113, or another area portion. In this case, the strategy information is preferably recorded in association with identification information which can identify the recording apparatus 1 (or 2 or 3) which has performed the recording compensation operation or which has generated the optimum strategy.

As described above, by recording the strategy information and the identification information which can identify the recording apparatus 1 that has performed the recording compensation operation or that has generated the optimum strategy onto the optical disc 100, it is possible to read the strategy information corresponding to the identification information about the recording apparatus 1, from the optical disc 100, when the data pattern is recorded by the recording apparatus 1. Thus, by using the read strategy, it is possible to receive the same various effects as those described above, in the recording operation performed on the optical disc 100 without performing the recording compensation operation or without newly generating the optimum strategy.

Moreover, even if the strategy information corresponding to the identification information about the recording apparatus 1 is not recorded on the optical disc 100, the same effects can be appropriately received by reading the strategy information corresponding to identification information close to the identification information about the recording apparatus 1 (in other words, identification information about another recording apparatus which has a similar property to that of the recording apparatus 1) from the optical disc 100 and by using the read strategy information. Alternatively, the same effects can be also appropriately received by performing the simple recording compensation operation on the basis of the strategy information corresponding to the identification information close to the identification information about the recording apparatus 1.

Moreover, even if the strategy information is not recorded on the optical disc 100 for the reason that the optical disc 100 is blank or the like, the recording compensation operation can be preferably performed or the optimum strategy can be generated by using each of the recording apparatuses in the aforementioned examples. Moreover, if the resulting strategy information is recorded on the optical disc 100 in association with the identification information about the recording apparatus 1, it is possible to receive the same various effects as those described above, in the recording performed on the optical disc 100, without going to the trouble of performing the recording compensation operation or of newly generating the optimum strategy.

In other words, without performing the operation shown in FIG. 3 or with the operation shown in FIG. 3 performed at least once, it is possible to receive the same various effects as those described above, in the recording performed on the optical disc 100, without going to the trouble of performing the recording compensation operation or of newly generating the optimum strategy on the corresponding recording apparatus 1. Therefore, it is possible to reduce the number of times that the recording compensation operation is performed, thereby saving an area required for the recording compensation operation.

The present invention is not limited to the aforementioned examples, but various changes may be made, if desired, without departing from the essence or spirit of the invention which can be read from the claims and the entire specification. A recording apparatus and method, a computer program, and a recording medium, all of which involve such changes, are also intended to be within the technical scope of the present invention.

The invention claimed is:

1. A recording apparatus for recording a data pattern onto a recording medium at an arbitrary recording speed, the recording apparatus comprising:

a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed;

a second strategy calculating device for calculating a second standard strategy used to record the data pattern at a second recording speed by performing a clock cycle conversion process according to a difference between the first recording speed and the second recording speed, which is different from the first recording speed, on the first standard strategy;

a second power calculating device for calculating a second optimum power used to record the data pattern at the second recording speed, on the basis of a result of reading the data pattern recorded at the second recording speed;

a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

2. The information recording apparatus according to claim 1, wherein the fourth strategy calculating device adjusts a third standard strategy, obtained by performing the clock conversion process according to a difference between the first recording speed and the third recording speed on the first standard strategy, in accordance with a difference obtained by linearly interpolating the difference between the first standard strategy and the first optimum strategy and the difference between the second standard strategy and the second optimum strategy, thereby calculating the third optimum strategy.

3. The information recording apparatus according to claim 2, wherein the data pattern includes a first-length mark, and a second-length space and a third-length space which are located before and after the first-length mark, and the fourth strategy calculating device adjusts a strategy of the third standard strategy for recording the first-length mark before and after which the second-length space and the third-length space are located, on the basis of each of (i) a shift amount of edges on both ends of a strategy of the first optimum strategy for recording the first-length mark before and after which the second-length space and the third-length space are located with respect to edges on both ends of a strategy of the first standard strategy for recording the first-length mark before and after which the second-length space and the third-length space are located and (ii) a shift amount of edges on both ends of a strategy of the second optimum strategy for recording the first-length mark before and after which the second-length space and the third-length space are located with respect to edges on both ends of a strategy of the second standard strategy for recording the first-length mark before and after which the second-length space and the third-length space are located.

4. The information recording apparatus according to claim 3, wherein if the first recording speed is a M-times speed, if the second recording speed is a N-times speed, if the third recording speed is a C-times speed, if the shift amount of the edges on the both ends of the strategy of the first optimum strategy for recording the first-length mark before and after which the second-length space and the third-length space are located with respect to the edges on the both ends of the strategy of the first standard strategy for recording the first-length mark before and after which the second-length space and the third-length space are located is m1(k) and m2(k), and if the shift amount of the edges on the both ends of the strategy of the second optimum strategy for recording the first-length mark before and after which the second-length space and the third-length space are located with respect to the edges on the both ends of the strategy of the second standard strategy for recording the first-length mark before and after which the second-length space and the third-length space are located is n1(k) and n2(k), then the fourth strategy calculating device shifts each of edges on both ends of the strategy of the third standard strategy for recording the first-length mark before and after which the second-length space and the third-length space are located, by respective one of $(n1(k)-m1(k))\times C/(N-M)+(N\times m1(k)-M\times n1(k))/(N-M)$ and $(n2(k)-m2(k))\times C/(N-M)+(N\times m2(k)-M\times n2(k))/(N-M)$.

5. The information recording apparatus according to claim 1, wherein the first standard strategy is the first optimum strategy.

6. The information recording apparatus according to claim 1, further comprising:

a first power calculating device for calculating a first optimum power used to record the data pattern at the first recording speed on the basis of a result of reading the data pattern recorded at the first recording speed; and a third power calculating device for calculating a third optimum power used to record the data pattern at the third recording speed on the basis of the first optimum power and the second optimum power.

7. The information recording apparatus according to claim 1, wherein the clock cycle conversion process enables a shape of the second standard strategy with respect to a clock at the second recording speed to be similar to a shape of the first standard strategy with respect to a clock at the first recording speed.

8. The information recording apparatus according to claim 1, wherein the clock cycle conversion process enables a shape of the second standard strategy with respect to a clock at the second recording speed to be similar to a shape of the first standard strategy with respect to a clock at the first recording speed, and the clock cycle conversion process increases or reduces a pulse width of a predetermined pulse included in the second standard strategy at a predetermined ratio.

9. The information recording apparatus according to claim 1, wherein the clock cycle conversion process converts the first standard strategy at a different rate in each of lengths of marks included in the data pattern.

10. The information recording apparatus according to claim 1, wherein the second power calculating device calculates, as the second optimum power, a power calculated by performing OPC (Optimum Power Control) for adjusting a power used to record the data pattern in the second standard strategy at the second recording speed such that asymmetry or a β value of a reproduction signal in reproducing the data pattern recorded at the second recording speed and in the second standard strategy is equal to asymmetry or a β value of a reproduction signal in reproducing the data pattern recorded at the first recording speed and in the first optimum strategy.

11. The information recording apparatus according to claim 10, wherein the third strategy calculating device adjusts a strategy of the second standard strategy for recording the data pattern of at least a long mark, thereby calculating the second optimum strategy.

12. The information recording apparatus according to claim 10, wherein the second power calculating device calculates a power which is reduced from a power calculated by performing the OPC (Optimum Power Control), as the second optimum power.

13. The information recording apparatus according to claim 1, wherein
the first strategy calculating device calculates the first optimum strategy which allows a shift jitter component caused by a state of the recorded data pattern from among the jitter to satisfy the desired condition, and
the third strategy calculating device calculates the second optimum strategy which allows a shift jitter component caused by a state of the data pattern recorded of the jitter to satisfy the desired condition.

14. The information recording apparatus according to claim 13, wherein a state in which the jitter satisfies the desired condition is a state in which the shift jitter component is less than or equal to a first predetermined value.

15. The information recording apparatus according to claim 13, wherein a state in which the jitter satisfies the desired condition is a state in which a ratio of a random jitter component, which is caused by a noise from among the jitter, to the jitter is greater than or equal to a second predetermined value.

16. The information recording apparatus according to claim 13, wherein a state in which the jitter satisfies the desired condition is a state in which the shift jitter components in a plurality of types of respective data patterns with different run lengths are substantially same to each other.

17. The information recording apparatus according to claim 1, further comprising:
a reading device for reading the data pattern, thereby obtaining a read signal; and
a measuring device for measuring jitter of the read signal,
each of the first strategy calculating device and the third strategy calculating device calculating the first optimum strategy or the second optimum strategy which allows the jitter measured by the measuring device to satisfy the desired condition.

18. The information recording apparatus according to claim 17, further comprising:
an amplitude limit filtering device for limiting an amplitude level of the read signal by using a predetermined amplitude limit value, thereby obtaining an amplitude limit signal and for performing a high-frequency emphasis filtering process on the amplitude limit signal, thereby obtaining an equalization-corrected signal; and
a detecting device for detecting the data pattern of the equalization-corrected signal,
the measuring device measuring jitter of the equalization-corrected signal as the jitter of the read signal,
each of the first strategy calculating device and the third strategy calculating device calculating the first optimum strategy or the second optimum strategy which allows the jitter measured by the measuring device to satisfy the desired condition, with reference to the data pattern detected by the detecting device.

19. The information recording apparatus according to claim 17, further comprising an adding device for adding a predetermined offset signal to the read signal, thereby obtaining an offset-added signal,
the measuring device measuring the jitter of the offset-added signal.

20. The information recording apparatus according to claim 17, further comprising a recording device for recording recording condition information which directly or indirectly indicates the third optimum strategy onto the recording medium.

21. A recording method of recording a data pattern onto a recording medium at an arbitrary recording speed,
the recording method comprising:
a first strategy calculating process of calculating a first optimum strategy which allows jitter of the data pattern recorded at a first recording speed to satisfy a desired condition, on the basis of a result of reading the data pattern recorded by a predetermined first standard strategy used to record the data pattern at the first recording speed;
a second strategy calculating process of calculating a second standard strategy used to record the data pattern at a second recording speed by performing a clock cycle conversion process according to a difference between the first recording speed and the second recording speed, which is different from the first recording speed, on the first standard strategy;
a second power calculating process of calculating a second optimum power used to record the data pattern at the second recording speed, on the basis of a result of reading the data pattern recorded at the second recording speed;
a third strategy calculating process of calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating process of calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

22. A computer readable recording medium wherein the recording medium is non-transitory recording thereon a computer program for recording control and for controlling a computer provided in a recording apparatus for recording a data pattern onto a recording medium at an arbitrary recording speed, the recording apparatus comprising: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating a third optimum strategy used to record the data pattern at a third recording speed which is different from the first recording speed and the second recording speed, on the basis of each of a difference between the first standard strategy and the first optimum strategy and a difference between the second standard strategy and the second optimum strategy, the computer program making the computer function as at least one portion of the first strategy calculating device, the second strategy calculating device, the second power calculating device, the third strategy calculating device, and the fourth strategy calculating device.

23. A recording medium comprising a recording condition recording area to record therein recording condition information which directly or indirectly indicates a third optimum power calculated by a recording apparatus for recording a data pattern onto a recording medium at an arbitrary recording speed, the recording apparatus comprising: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating the third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

24. A recording medium on which a data pattern is recorded by using a third optimum strategy calculated by a recording apparatus for recording the data pattern onto a recording medium at an arbitrary recording speed, the recording apparatus comprising: a first strategy calculating device for calculating a first optimum strategy which allows jitter of the data pattern recorded at a first recording speed to satisfy a desired condition, on the basis of a result of reading the data pattern recorded by a predetermined first standard strategy used to record the data pattern at the first recording speed; a second strategy calculating device for calculating a second standard strategy used to record the data pattern at a second recording speed by performing a clock cycle conversion process according to a difference between the first recording speed and the second recording speed, which is different from the first recording speed, on the first standard strategy; a second power calculating device for calculating a second optimum power used to record the data pattern at the second recording speed, on the basis of a result of reading the data pattern recorded at the second recording speed; a third strategy calculating device for calculating a second optimum strategy which allows jitter of the data pattern recorded at the second recording speed to satisfy a desired condition, by adjusting a strategy of the second standard strategy for recording at least one portion of the data pattern, on the basis of a result of reading the data pattern recorded at the second recording speed with the second optimum power and in the second standard strategy; and a fourth strategy calculating device for calculating the third optimum strategy used to record the data pattern at a third recording speed which is different from the first recording speed and the second recording speed, on the basis of each of a difference between the first standard strategy and the first optimum strategy and a difference between the second standard strategy and the second optimum strategy.

* * * * *